US009353966B2

United States Patent
Finkam

(10) Patent No.: US 9,353,966 B2
(45) Date of Patent: May 31, 2016

(54) SYSTEM FOR INCREASING OPERATING EFFICIENCY OF AN HVAC SYSTEM INCLUDING AIR IONIZATION

(71) Applicant: Advanced Control Technologies, Inc., Indianapolis, IN (US)

(72) Inventor: Joseph Finkam, Carmel, IN (US)

(73) Assignee: IAIRE L.L.C., Indianapolis, IN (US)

( * ) Notice: Subject to any disclaimer, the term of this patent is extended or adjusted under 35 U.S.C. 154(b) by 354 days.

(21) Appl. No.: 13/838,328

(22) Filed: Mar. 15, 2013

(65) Prior Publication Data

US 2014/0260965 A1    Sep. 18, 2014

(51) Int. Cl.

| | |
|---|---|
| *B01D 53/02* | (2006.01) |
| *F24F 12/00* | (2006.01) |
| *F24F 11/00* | (2006.01) |
| *B01D 53/30* | (2006.01) |
| *B01D 53/32* | (2006.01) |
| *B01D 53/62* | (2006.01) |
| *B01D 53/72* | (2006.01) |
| *F24F 3/16* | (2006.01) |

(52) U.S. Cl.
CPC ............. *F24F 12/001* (2013.01); *B01D 53/30* (2013.01); *B01D 53/323* (2013.01); *B01D 53/62* (2013.01); *B01D 53/72* (2013.01); *F24F 11/0079* (2013.01); *B01D 2257/504* (2013.01); *B01D 2257/708* (2013.01); *B01D 2258/06* (2013.01); *B01D 2259/4508* (2013.01); *F24F 2003/1682* (2013.01); *F24F 2011/0026* (2013.01); *F24F 2011/0032* (2013.01); *Y02B 30/563* (2013.01); *Y02B 30/746* (2013.01); *Y02B 30/78* (2013.01); *Y02C 10/04* (2013.01)

(58) Field of Classification Search
CPC .................. B01D 2257/504; B01D 2257/708; B01D 2258/06; B01D 2259/4508; B01D 53/30; B01D 53/323; B01D 53/62; B01D 53/72; F24F 11/0079; F24F 12/001; F24F 2003/1682; F24F 2011/0026; F24F 2011/0032; Y02B 30/563; Y02B 30/746; Y02B 30/78
See application file for complete search history.

(56) References Cited

U.S. PATENT DOCUMENTS

| | | | |
|---|---|---|---|
| 2,723,349 A | | 11/1955 | Rylsky |
| 3,047,718 A | | 7/1962 | Fleming et al. |
| 3,624,448 A | | 11/1971 | Saurenman et al. |
| 3,936,698 A | | 2/1976 | Meyer |
| 3,979,922 A | | 9/1976 | Shavit |
| 4,182,180 A | | 1/1980 | Mott |
| 4,215,408 A | * | 7/1980 | Games et al. ................. 700/278 |
| 4,264,343 A | | 4/1981 | Natarajan et al. |
| 4,347,712 A | | 9/1982 | Benton et al. |

(Continued)

FOREIGN PATENT DOCUMENTS

| | | |
|---|---|---|
| CN | 2304229 Y | 1/1999 |
| CN | 2482752 Y | 3/2002 |

(Continued)

*Primary Examiner* — Christopher P Jones
(74) *Attorney, Agent, or Firm* — Faegre Baker Daniels LLP

(57) ABSTRACT

Disclosed is an HVAC system having one or more air ionization devices for increasing operating efficiency and reduces overall cost by reducing the level of volatile organic compounds in recirculated building air. Also disclosed are combinations of heat exchangers operating in conjunction with ionization to further reduce operating costs. Included are various control sequences for a controller useful for managing air quality using CO2, VOC and other sensors to maintain air quality at reduced cost.

19 Claims, 17 Drawing Sheets

(56) References Cited

U.S. PATENT DOCUMENTS

| | | | |
|---|---|---|---|
| 4,570,448 A | 2/1986 | Smith | |
| 4,757,422 A | 7/1988 | Bossard et al. | |
| 4,901,194 A | 2/1990 | Steinman et al. | |
| 4,974,115 A | 11/1990 | Breidegam et al. | |
| 5,065,272 A | 11/1991 | Owen et al. | |
| RE34,346 E | 8/1993 | Foster, Jr. et al. | |
| 5,292,280 A | 3/1994 | Janu et al. | |
| 5,332,425 A | 7/1994 | Huang | |
| 5,484,472 A | 1/1996 | Weinberg | |
| 5,564,626 A | 10/1996 | Kettler et al. | |
| 5,597,354 A | 1/1997 | Janu et al. | |
| 5,741,352 A | 4/1998 | Ford et al. | |
| 6,056,808 A | 5/2000 | Krause | |
| 6,432,367 B1 | 8/2002 | Munk | |
| 6,528,023 B2 | 3/2003 | Fleischer | |
| 6,680,033 B2 | 1/2004 | Ishii | |
| 6,711,470 B1 | 3/2004 | Hartenstein et al. | |
| 6,717,414 B1 | 4/2004 | Rodrigo et al. | |
| 6,826,920 B2 | 12/2004 | Wacker | |
| 6,850,403 B1 | 2/2005 | Gefter et al. | |
| 7,040,101 B2 | 5/2006 | Takeda et al. | |
| 7,177,133 B2 | 2/2007 | Riskin | |
| 7,256,979 B2 | 8/2007 | Sekoguchi et al. | |
| 7,434,413 B2 | 10/2008 | Wruck | |
| 8,106,367 B2 | 1/2012 | Riskin | |
| 8,147,302 B2 | 4/2012 | Desrochers et al. | |
| 8,157,892 B2 | 4/2012 | Meirav | |
| 8,195,335 B2 | 6/2012 | Kreft et al. | |
| 9,025,303 B2 | 5/2015 | Waddell et al. | |
| 2002/0090908 A1* | 7/2002 | Estepp | 454/236 |
| 2006/0112829 A1* | 6/2006 | Ashworth | 96/397 |
| 2008/0014857 A1 | 1/2008 | Spadafora et al. | |
| 2008/0041138 A1* | 2/2008 | Marra | 73/31.02 |
| 2010/0070091 A1* | 3/2010 | Watson et al. | 700/278 |
| 2010/0175391 A1 | 7/2010 | Jee et al. | |
| 2011/0168793 A1 | 7/2011 | Kreft et al. | |
| 2011/0253359 A1 | 10/2011 | Stockton | |
| 2011/0264273 A1 | 10/2011 | Grabinger et al. | |
| 2011/0264274 A1 | 10/2011 | Grabinger et al. | |
| 2011/0264275 A1 | 10/2011 | Thomle et al. | |
| 2011/0264280 A1 | 10/2011 | Grabinger et al. | |
| 2012/0052791 A1 | 3/2012 | Kurelowech | |
| 2012/0078563 A1 | 3/2012 | Grabinger et al. | |
| 2012/0079425 A1 | 3/2012 | Grabinger et al. | |
| 2012/0232702 A1 | 9/2012 | Vass et al. | |
| 2012/0245968 A1 | 9/2012 | Beaulieu et al. | |
| 2013/0085613 A1* | 4/2013 | Bester et al. | 700/277 |

FOREIGN PATENT DOCUMENTS

| | | |
|---|---|---|
| CN | 1445894 A | 10/2003 |
| CN | 1658455 A | 8/2005 |
| CN | 2722478 Y | 8/2005 |
| CN | 201049089 Y | 4/2008 |
| CN | 101278451 A | 10/2008 |
| CN | 201147515 Y | 11/2008 |
| FR | 1319296 | 2/1963 |

* cited by examiner

SYSTEM FOR INCREASING OPERATING EFFICIENCY OF AN HVAC SYSTEM INCLUDING AIR IONIZATION

BACKGROUND

HVAC systems are commonly configured to heat and cool air in an enclosed space, and may also constantly circulate the air to aid in maintaining a comfortable environment. HVAC systems may also be configured to introduce some quantity of outside air from time to time into the enclosed space as necessary to reduce or dilute various air contaminants such as carbon dioxide, or various vaporous or volatile organic compounds which may be irritating or potentially hazardous to the occupants. Introducing this outside air may require the exchange of previously conditioned air thus potentially increasing the thermal load on the HVAC system and making it less energy-efficient to operate. Furthermore, certain minimum air quality standards have been adopted by most building inspection authorities requiring that certain levels of air exchange the maintained, or that the level of certain air contaminants be monitored and regulated. This creates reduced efficiency as equipment and operating costs compliance requirements dictate increases in the rate of air exchange.

SUMMARY

Disclosed are embodiments of an HVAC system that increases operating efficiency and reduces overall cost by using air ionization to reduce the level of volatile organic compounds in the recirculated air. By using ionization to reduce the level of air contaminants circulating through the air, the overall size of the HVAC components can be reduced at the outset. In operation, the unit uses less power because it creates a reduced thermal load caused by the ability to recirculate more inside air that has already been conditioned rather than bringing in outside air that must be either heated or cooled.

Also disclosed are various combinations of HVAC units using air ionization operating in conjunction with heat exchangers controlled to reduce levels of outdoor air exchange while still maintaining the required level of air quality and comfort. Included are embodiments of operational sequences involving various temperature, enthalpy, and other sensors both inside and outside the enclosed space along with CO2 and VOCs sensors as well.

Further forms, objects, features, aspects, benefits, advantages, and embodiments of the present invention will become apparent from the detailed description and drawings provided herewith.

DETAILED DESCRIPTION

Figure 1:
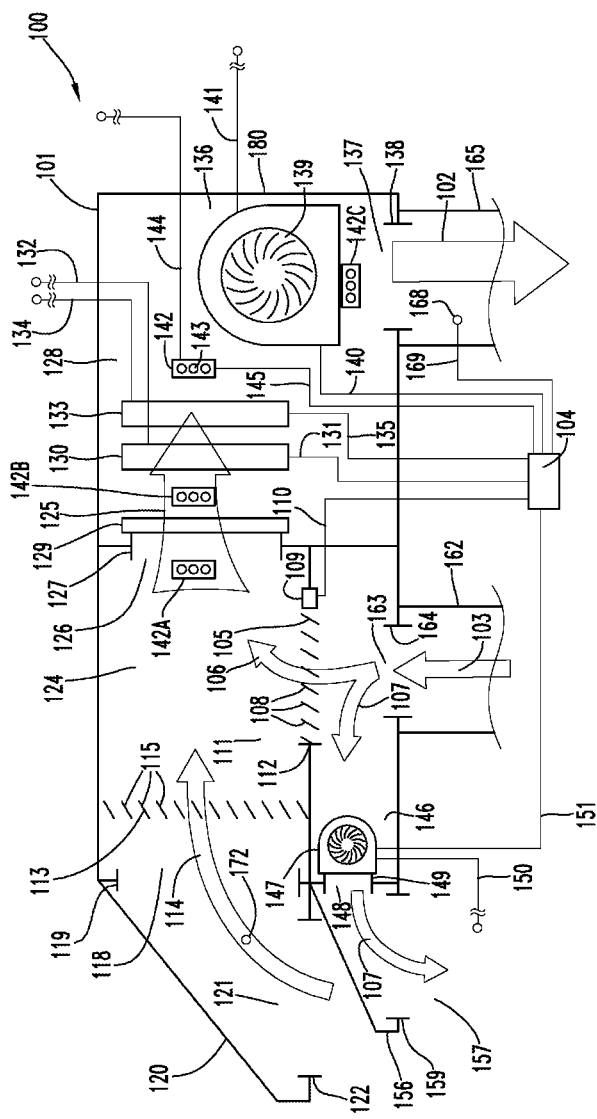
FIG. 1 illustrates a diagrammatic view of one example of a system for conditioning air using ionization.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 2:
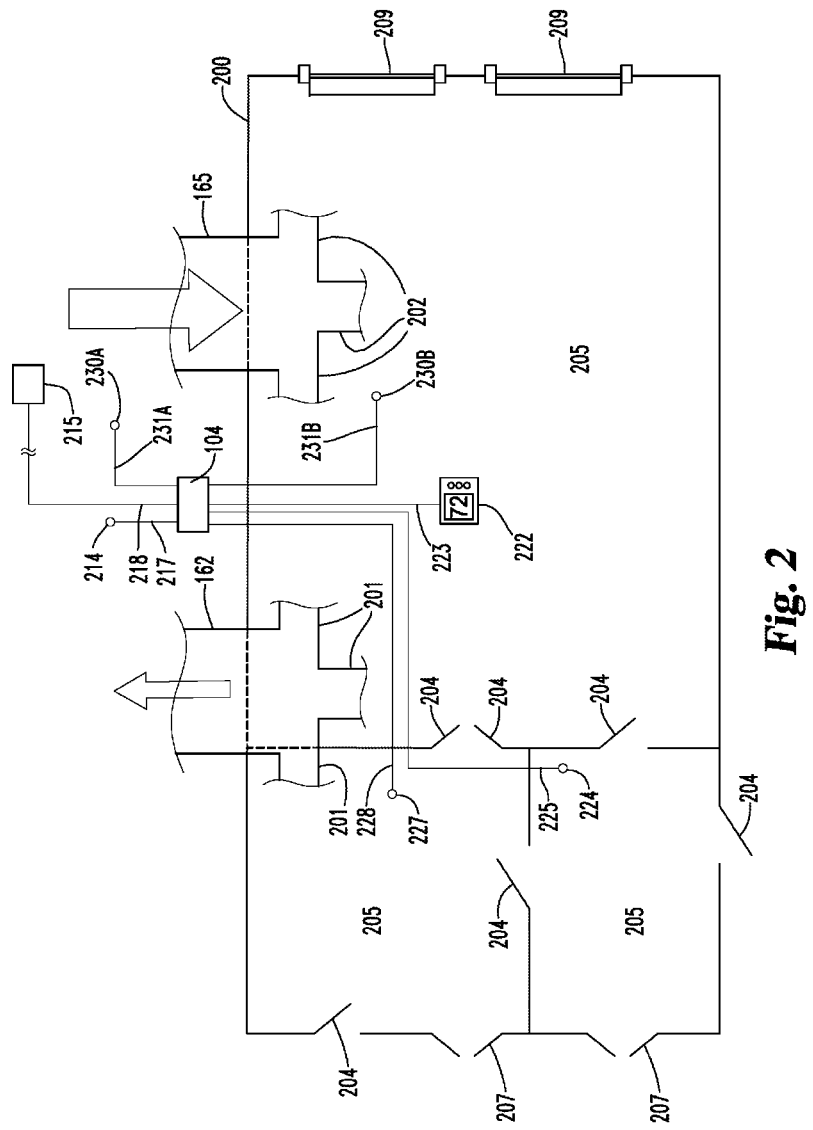
FIG. 2 illustrates a diagrammatic view of an enclosed space coupled to the unit of FIG. 1.

The first illustrated embodiment is shown in FIG. 1 with references to FIG. 2 as well. A rooftop heating, ventilating, and air condition unit is showing which operates as an air mixing and apparatus controlling the flow and quantity of outside air entering the enclosed space. The unit includes various assemblies and devices for regulating and mixing flows of air to recirculated air from the enclosed space through the rooftop unit 101 and back into the enclosed space. The unit also includes at least one air ionizing device to ionize the air as it circulates through rooftop unit. This has the effect of improving or maintaining the air quality while reducing the need to introduce outside air into the enclosed space possibly requiring further energy to be expended to heat or cool the new air. In this way, air quality can be maintained or increased at reduced cost by possibly reducing the need to introduce unconditioned outside air into the enclosed space thus possibly reducing the cost of maintaining a comfortable environment within the enclosed space.

A system for conditioning air within an enclosed space is illustrated is shown at 100 in FIG. 1 with a rooftop unit 101 configured to circulate air through an enclosed space 200 shown in FIG. 2. Rooftop unit 101 circulates air throughout the enclosed space by introducing a supply air flow 102 into enclosed space 200 and receiving a return air flow 103 into rooftop unit 101 from enclosed space 200. Rooftop unit 101 includes various air movers such as blowers or fans, as well as various adjustable closures such as dampers for regulating the air flows into, out of, and through rooftop unit 101, as well as the circulation of air throughout the enclosed space. Temperature adjusting units are also included such as heating and cooling units for increasing or decreasing the temperature of the air within rooftop unit 101. At least one air ionization device is included as well as for reducing one or more airborne contaminants in the enclosed space. A controller 104 is included and configured to control some of the devices described below while in some cases only responding to the actions of others. These and other aspects are discussed in detail below.

As shown in FIG. 1 and making reference to FIG. 2 as well, rooftop unit 101 includes a return air regulating assembly 105 mounted in a primary enclosure 180 configured to regulate the return air flow 103 creating a recirculated air flow 106 and an exhaust air flow 107. In this embodiment, return air regulating assembly 105, includes one or more louvers, fins, or vanes 108 coupled to an actuator 109 which is responsive to controller 104 by a control line 110. In one embodiment of actuator 109, controller 104 controls actuator 109 to open and close vanes 108 while also receiving feedback from actuator 109 indicating the position of vanes 108 as well. Therefore in this embodiment, controller 104 sends signals to actuator 109 and receives signals in return as well.

Return air regulating assembly 105 is also positioned in the primary enclosure 180 of rooftop unit 101 to regulate the recirculated air flow 106. Recirculated air flow 106 is received through a return air inlet 111 defined by an opening 112 in rooftop unit 101. In this embodiment, controller 104 controls actuator 109 to open and close louvers 108, thus adjusting the quantity of air in recirculated air flow 106 which is a portion of return air flow 103 passing through return air inlet 111. The remainder of return air flow 103 not passing through return air inlet 111 constitutes exhaust air flow 107. Exhaust air flow 107 passes out of rooftop unit 101 through exhaust air outlet 148 as described in further detail below.

In another aspect air flow control, rooftop unit 101 includes an outside air regulating assembly 113 configured to regulate an outside air flow 114 of air received from outside rooftop unit 101 and enclosed space 200. In the illustrated embodiment, outside air regulating assembly 113 operates similarly to return air regulating assembly 105 and includes one or more louvers, fins, or vanes 115 which are also coupled to actuator 109 under the of control of controller 104. In the illustrated embodiment, controller 104 controls actuator 109 to open and close louvers 115, thus adjusting the quantity of outside air flow 114. Outside air flow 114 enters rooftop unit 101 through an outside air inlet 118 defined by an opening 119 in primary enclosure 180.

In the illustrated embodiment, actuator 109 controls both outside air regulating assembly 113 and return air regulating assembly 105. This may be accomplished, for example, by a mechanical linkage between the two assemblies calibrated so that when actuator 109 is controlled to open vanes 108, vanes 115 automatically close by a corresponding preset amount to maintain proper ventilation and air mixture between return air flow 103 and outside air flow 114.

Roof top unit 101 also includes an air hood 120 coupled to primary enclosure 180 and positioned to protect opening 119 from foreign object debris while still allowing outside air flow 114 to enter rooftop unit 101. Outside air flow 114 enters air hood 120 through an air hood inlet 121 defined by outside air hood opening 122 in air hood 120.

After outside air flow 114 and recirculated air flow 106 enter rooftop unit 101, these air flows enter a mixing region 124 within primary enclosure 180 where outside air flow 114 and recirculated air flow 106 combine to form a mixed air flow 125. Mixed air flow 125 then passes from mixing region 124 of rooftop unit 101 into a separate temperature adjusting region 128 of primary enclosure 180 through a mixed air inlet 126 defined by a mixed air opening 127. Mixed air flow 125 may also passes through an air filter 129 optionally positioned downstream from mixed air inlet 126 in mixed air flow 125 as shown in FIG. 1. In one embodiment, filter 129 is designed to capture particles of varying sizes, including dust, lint, hair, mites or other similar tiny airborne creatures, spores, pollen and the like, including microscopic particles, for the purpose of capturing such particles rather than continuously recirculating them through enclosed space 200 and rooftop unit 101. In the illustrated embodiment, filter 129 is also positioned to receive substantially all of mixed air flow 125 in order to trap as much foreign object debris as possible.

Also included in the illustrated embodiment of temperature adjusting region 128 is a heating unit 130 and a cooling unit 133. Heating unit 130 and cooling unit 133 are examples of temperature adjusting units configured to raise or lower the temperature of mixed air flow 125 before mixed air flow 125 enters the enclosed space 200 as supply air flow 102. In this embodiment, controller 104 is responsive to heating unit 130 and commands issued to it by thermostat 222 (see FIG. 2), but heating unit 130 is not responsive to the controller 104. Put another way, control line 131 receives signals and data about the operational state of heating unit 130 perhaps from the unit itself, and perhaps from other sources as well, but controller 104 does not send signals to heating unit 130 to control its behavior. One the other hand, cooling unit 133 is responsive to controller 104 by a control line 135 both sending commands to the cooling unit, and receiving operating state information back from the unit as well. Both the heating and cooling units 130 and 133 receive operating power from a power connection 134 and 132 respectively as shown. The power connection may be any suitable power connection such as a standard building AC power connection. Throughout the remainder of the detailed description, references to a "standard power connection" shall be understood to mean: Any suitable power connection, AC or DC, or another type, such as a standard AC building power connection.

Heating unit 130 and cooling unit 133 may be configured and positioned in temperature adjusting region 128 so that mixed air flow 125 passes over, around, or through them as necessary so that heat exchange may occur to adjust the temperature of mixed air flow 125. Heating unit 130 and cooling unit 133 may be constructed with one or more heat exchangers possibly including active heating elements or cooling loops including multiple fins or other heat exchange elements such as are commonly known in the art. Therefore as mixed air flow 125 passes through and around heating and cooling units 130 and 133, the temperature of the mixed air flow 125 may be raised or lowered accordingly depending on signals sent by controller 104 and thermostat 222, or possibly other control circuitry as well. Heating unit 130, and cooling unit 133 may also include one or more stages of heating and cooling such as multiple compressors, multiple levels of resistive heat, and the like.

Rooftop unit 101 in FIG. 1 also includes a supply air regulating assembly 136 configured to introduce the supply air flow 102 into enclosed space 200 through a supply air outlet 137 defined by a supply air opening 138 in the primary enclosure 180. In one embodiment, supply air regulating assembly 136 includes an air moving apparatus such as a fan or blower like supply air fan 139 coupled to controller 104 through a control line 140 drawing operating power from a standard power connection 141. Supply air fan 139 is another example of a device which provides data to controller 104 through control line 140, but does not accept commands from control 104 in return. As will be discussed in greater detail below, controller 104 senses the operational state of supply air fan 139, such as its speed, or whether it is on or off, but does not directly change it's speed.

Rooftop unit 101 also includes one or more ionization devices 142 positioned in the primary enclosure 180 where each device includes one or more ionizing elements 143. Ionization device 142 operates to reduce one or more contaminants from the circulated air in primary enclosure 180, such as, for example, Volatile Organic Compounds (VOCs) or other such airborne contaminants that can be removed, or whose removal is facilitated or simplified by the ionization of the circulated air. Activating ionization device 142 reduces the saturation of these airborne contaminants while deactivating device 142, leaves the process of removing VOCs to the less energy efficient method of diluting the return air with increased flows of outside air in order to keep the supply air (and thus the air in the enclosed space 200) from becoming over saturated with harmful contaminants.

A volatile organic compound or "VOC" is generally any compound of carbon which has a high vapor pressure, low-to-medium water solubility, and a low molecular weight. Some VOCs may be dangerous to human health or cause harm to the environment. For example VOCs may cause or aggravate certain conditions including allergies, asthma, cancer, and emphysema.

Indoor air quality may be affected by VOCs from a variety of sources. In one example, building materials such as paints, adhesives, wall boards, and ceiling tiles frequently contain formaldehyde. Formaldehyde is an irritant, affecting the mucous membranes. Paints and coatings are another source of VOCs. Typical solvents for use in paints and coatings include aliphatic hydrocarbons, ethyl acetate, ethers, and acetone. Carpets and vinyl floors are another common source of VOCs. Spray paints, hair sprays, and other aerosol cans in the past had used chlorofluorocarbons as propellants, they often now use commonly liquefied petroleum gas or other alternative propellants which contain VOCs. For example, acetaldehyde is a common VOC found in numerous sources including disinfectants, adhesives, coatings, plastics, lubricants, and is also a by product from the ripening of fruit.

Benzene, another VOC, is found in many common compositions. It can be found in smoke, stored fuels, and exhaust from cars. Benzene is frequently used to make other chemicals in the production of plastics, resins, and synthetic fibers. Benzene evaporates into the air quickly and the vapor of benzene is heavier than air causing the compound to sink into low-lying areas. Benzene has also been known to contaminate food and water and if digested can lead to a variety of symptoms including vomiting, dizziness, sleepiness, rapid heartbeat, and at high levels death may occur.

VOCs include, but are not limited to: 1-hexene; 1-isocyanobutane; 1,1,1-trichloroethane; 1,4-dioxane; 2-bromopentane; (2-methylcyclohexyl)propanedinitrile; 2,2-dimethylbutane; 2,3,3,trimethylpentane; 2,3-dimethylpenatne; 2,3,4-trimethylpentane; 3-methylhexane; 3,4-dimethyl-1-pentene; 4-methyl-1-pentene; 5-methyl-1-hexene; 6-methyl-1-heptanol; acetaldehyde; acetic acid; acetic acid esters; acetone; bis-(1,1-dimethylethyl)nitroxide; benzene; butoxyethanol; butyl acetate; hydrocarbons; C1-C10 substituted alkanes; carbon monoxide; decanal; dichlorobenzene; dipropylene glycol; ethanol; eucalyptol; formaldehyde; heptane; isobutene; isobutene; isoprene; limonene; methane; methoxyethanol; methoxyethoxyethanol; methylcyclohexane; methylethylketone; methyl methacrylate; naphthalene; nonanal; pentane; phenol; pinene; propane; tetrachloroethene; tetrachloroethylene; toluene; trichloromethane; and xylene.

Although FIG. 1 shows ionization device 142 configured with three ionizing elements 143 to reduce the concentration of VOCs such as coronal discharge devices or other similar devices, no limitation should be implied with respect to the type, number, or relative size of ionizing elements 143. Ionization device 142 may have only one element 143, three elements, five elements, less or more. Ionization device 142 may be a series of glass tubes incorporating one or more layers of wire mesh or other conductive material, or elements 143 themselves be a wire mesh or other ionizing material ionizing mixed air flow 125. An ionization power connection 144 operates to provide power to ionization device 142 such as a standard power connection, or other suitable power connection. In one embodiment of the system 100, ionization device 142 may be configured to operate at all times whenever power connection 144 provides power, such as for example, whenever rooftop unit 101 is powered. Controller 104 may be optionally connected to ionization device 142 by control line 145 allowing controller 104 to receive signals from ionization device 142 to monitor its operations.

FIG. 1 also indicates alternate locations 142A, 142B, and 142C for mounting ionization unit 142 within primary enclosure 180 for ionizing air within the enclosure, for example, mixed air flow 125. Regardless of the position or ionization device 142, control line 145, and ionization power connection 144 would be similarly coupled to ionization device 142 as shown in FIG. 1. In another embodiment, one or more ionization devices 142 may optionally be installed at all four designated locations, or at any other location suitable for ionizing air in primary enclosure 180. In the illustrated embodiment, ionization unit 142 is positioned to allow mixed air flow 125 (or supply air flow 102) to pass over and around or through ionization device 142. However, in other embodiments, ionization device 142 may also be positioned to intercept other air flows such as outside air flow 114, return air flow 103, or recirculated air flow 106 in addition to, or instead of mixed air flow 125. Any suitable positioning of ionization device 142 is envisioned.

As briefly discussed previously with respect to the regulation of mixed air flow 125, rooftop unit 101 optionally includes an exhaust regulating assembly 146 which may also include an exhaust fan 147 positioned in primary enclosure 180. If included in rooftop unit 101 as shown if FIG. 1, exhaust fan 147 operates to regulate exhaust air flow 107 exiting rooftop unit 101 through an exhaust air outlet 148 defined by an exhaust air opening 149 in primary enclosure 180. Exhaust fan 147 is responsive to the controller 104 by a control line 150 and receives operating power through a standard power connection 150. Exhaust fan 147 operates as an exhaust regulating assembly 146 to regulate exhaust air flow 107. In the illustrated embodiments in FIG. 1, exhaust air flow 107 exits rooftop unit 101 through exhaust air outlet 148 thus venting a portion of return air flow 103 into exhaust hood 156 where it passes through exhaust hood outlet 157 defined by exhaust hood opening 159 and into the air outside rooftop unit 101 and enclosed space 200.

It should also be noted that various devices contribute to the control of the various air flows moving through roof top unit 101. In this respect, a roof top unit can be considered an air mixing device or apparatus as it mixes multiple flows of air together. For example, supply air fan 139 is commonly the primary source of pressure differentials between supply air opening 138, return air opening 163, and outside air opening 118. The negative pressure created by supply air fan 139 is substantial and operates in large part to create outside air flow 114, and return air flow 113. In most cases, until vanes 108 are nearly closed, exhaust air flow 107 routinely flows in the opposite direction as well as air is pulled into exhaust opening 157 by the strong negative pressure created by supply air fan 139 (assuming exhaust fan 147 is not running).

As supply air fan 139 increases speed and energizes the flow of supply air 102 into the enclosed space 200, negative pressure appears at return air inlet 111 and outside air inlet 118. This negative pressure is a significant factor in generating outside air flow 114 and return recirculated air flow 106. The relative amounts of recirculated air 106 and outside air 114 introduced into mixed air flow 125 may be adjusted using controller 104 controlling actuator 109 adjusting closures 108 and 115 as described previously. However without the negative pressure generated by supply air fan 139, mixed air flow 125 will likely be very limited in volume and speed, or may not be generated at all. Therefore supply air fan 139 may be considered as part of the outside air regulating assembly 113 and the return air regulating assembly 105.

Exhaust air fan 147 may also be considered part of the air regulating assemblies 113 and 105. As with supply air fan 139, the composition of mixed air flow 125 may be altered to some extent by the activities of exhaust air fan 147. The activation of exhaust air fan 147 creates an increased negative pressure on return air flow 103 which, depending on the position of vanes 108 may cause a significant change in the amount of recirculated air 106 entering mixed air flow 125. On the other hand, shutting down exhaust air fan 147 will reduce exhaust air flow 107 to almost nothing, and as noted above, will likely cause it to reverse direction depending on the configuration of the unit and the speed of supply air fan 139. This change will cause substantially all of return air flow 103 to recirculate with whatever outside air flow 114 is entering mixed air flow 125. But as noted above, this usually dependent to a large extent on the speed of supply air fan 139 as discussed above and the degree to which it energizes negative pressure across these outside and return air openings.

As illustrated in FIGS. 1 and 2, rooftop unit 101 is coupled to enclosed space 200 by at least a return air duct 162 and a supply air duct 165. Return air duct 162 is coupled to the rooftop unit 101 at a return air inlet 163 defined by a return air opening 164 in primary enclosure 180 and supply air duct 165 is coupled to rooftop unit 101 at supply air inlet 137. Return air enters return air duct 162 from the enclosed space 200 at one or more locations and optionally divides into one or more ducts 201 to receive air from various locations throughout the enclosed space. Similarly, supply air duct 165 also divides into multiple smaller supply ducts 202 to distribute supply air from the rooftop unit 101 to various locations within the enclosed space 200.

Enclosed space 200 may include various arrangements of openings such as doors 204 commonly used by human beings to enter and leave one or more rooms 205 which may also include other openings such as windows 207. These openings 204 and 207 may include openings to the outside air as well such as loading dock doors 209 which raise and lower, or larger openings such as retractable roofs and the like which may at times be open or closed. Enclosed space 200 may be an office building, a commercial building, a bank, a multi-family dwelling such as an apartment building, a residential home, a factory, an enclosed or enclosable entertainment venue, a hospital, a store, a school, a single or multi-unit storage facility, a laboratory, a vehicle, an aircraft, a bus, a theatre, a partially and/or fully enclosed arena, a shopping mall, an education facility, a library, a ship, or other partially or fully enclosed structure.

System 100 also includes various sensors also shown in FIGS. 1 and 2, and in succeeding figures as well. These sensors provide data signals to controller 104, and possibly to other devices as well such as thermostats, other control devices, or building management systems. A supply air sensor 168 is included in rooftop unit 101 in fluid communication with supply air flow 102 and is also configured to measure temperature and possibly other properties of supply air flow 102 such as enthalpy and humidity. This temperature and other supply air data is provided to controller 104 through a control line 169 electrically connected to controller 104.

Properties of the outside air are determined by an outside air sensor 214 collecting outside air data such as temperature readings. Other air properties may optionally be sampled as well such as enthalpy, humidity, carbon dioxide ($CO_2$) saturation, and ozone levels to name a few. These values are relayed to controller 104 by an outside data control line 217 coupled to controller 104 which is responsive to air sensor 214. System 100 includes optional mounting positions for sensor 214. Sensor 214 may be optionally mounted at location 172 within outside air hood 120 for sampling the air as it enters roof top unit 101 through outside air flow 114. One optional mount is shown, however, the position of location 172 may be adjusted as necessary to suit the needs of the particular embodiment of system 100, and more than one sensor may be used as well. For example, location 172 might also be mounted on an outside surface of primary enclosure 180.

As shown in FIG. 2, controller 104 receives data signals from thermostat 222 on a control line 223. Thermostat 222 may provide data regarding any combination of the following inputs to controller 104: temperature, roof top unit supply fan running state, the state of any roof top unit heating and cooling units and what stage they are operating in, and possibly many others. Only one thermostat 222 is shown however this is meant as exemplary rather than restrictive and no restriction on the number of thermostats should be implied. System 100 may include multiple thermostats positioned around the enclosed space 200, as well as an optional connection 218 to one or more other controllers 215, such as a building management system, or another controller similar to controller 104. This optional connection allows controller 104 to be responsive not only to the various air sensors and thermostats described, but to signals provided by other third party controllers as well which may be controlling other heating, ventilating, air conditioning systems, or air quality monitoring and remediation systems.

Also included in system 100 are one or more carbon dioxide ($CO_2$) sensors illustrated at 224 provide which provide $CO_2$ saturation information to controller 104 through control line 225. Likewise one or more Volatile Organic Compound (VOC) sensors 227 provide volatile organic compound saturation data to controller 104 through control line 228. Controller 104 can also receive building pressure information to measure the relative pressure differential between the inside and outside of the enclosed space 200. Internal building pressure sensor 230A measures the internal pressures which are compared with outside air pressure measured by an air pressure sensor 230B. Both sensors provide building pressure data through control lines 231A and 231B electrically connected to controller 104 as shown in FIG. 2.

Figure 3:
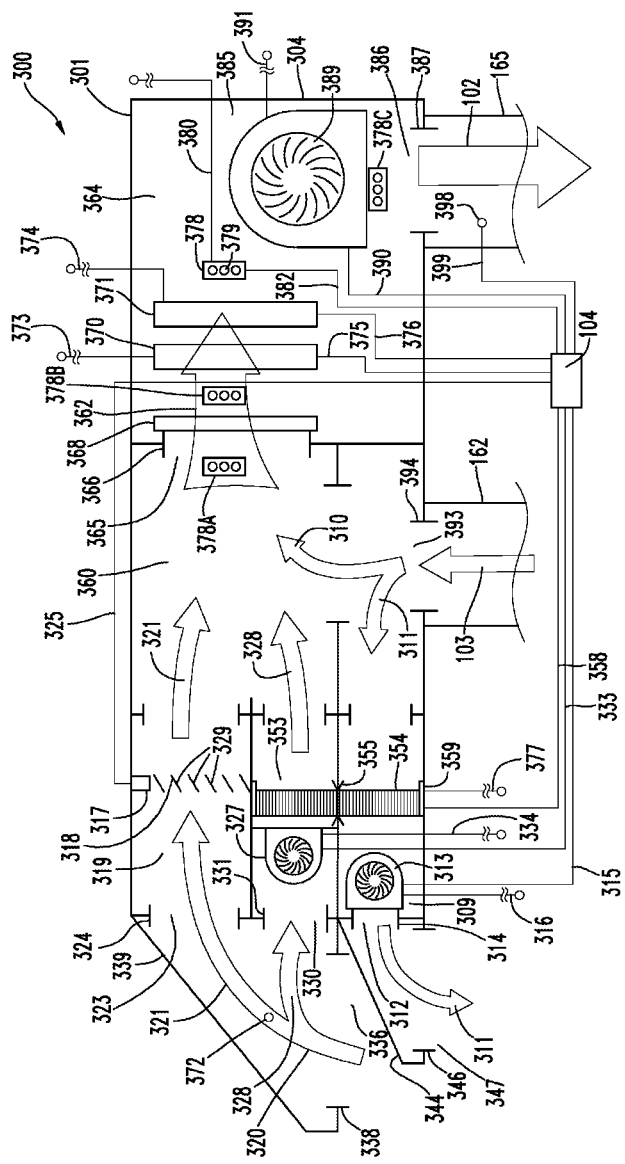
FIG. 3 illustrates a diagrammatic view of a second embodiment of a system for conditioning air using ionization similar to the embodiment shown in FIG. 1.

A second embodiment of a system for conditioning air within the enclosed space is illustrated at 300 in FIG. 3 with reference to FIG. 2 as well. FIG. 3 illustrates a rooftop unit 301 that is similar to rooftop unit 101 in many respects except that rooftop unit 301 includes a heat exchanger 353 such as, for example, an Energy Recovery Ventilation (ERV) unit for increasing efficiency by reducing energy lost as conditioned air from enclosed space 200 is exhausted into the outside air, for example, to maintain proper air quality. Air flow regulating assemblies including fans or possible dampers included in heat exchanger 353 also operate to regulate the flow of return air, exhaust air, and outside air as well. With an added heat exchanger, further energy savings may be achieved by preconditioning air as it enters the unit, thereby recovering some of the energy spent to heat or cool the air being exhausted outside.

Rooftop unit 301 is constructed in a manner similar to rooftop unit 101 in many respects, and in many respects operates similarly as well. As illustrated in FIG. 3, and making reference to FIG. 2 as well, rooftop unit 301 introduces the supply air flow 102 into enclosed space 200 through a supply air outlet 386 into supply air duct 165. A return air flow 103 is received from the enclosed space 200 through return air duct 162 similar to roof top unit 101. System 300 also includes controller 104 indicating that in at least one embodiment, controller 104 includes control lines, connection points, and logic for controlling both rooftop units 101 and 301, as well as other units shown in later figures and described below.

In rooftop unit 301, a return air regulating assembly 309 is included as part of heat exchanger 353 mounted within a primary enclosure 304. Return air regulating assembly regulates a return air flow 103 entering through a return air inlet 393 defined by a return air opening 394 in the primary enclosure 304. Return air flow 103 enters primary enclosure 304 and separates into at least a recirculated air flow 310 and an exhaust air flow 311. Return air regulating assembly 309 includes an exhaust fan 313 positioned to reject exhaust air flow 311 into the outside air through an exhaust outlet 312 defined by an exhaust air opening 314 in primary enclosure 304. Exhaust fan 313 is responsive to controller 104 by control line 315 and is powered by a standard power connection 316. By controlling the speed of fan 313, controller 104 can impact the ratio of recirculated air flow 310 and exhaust air flow 311 entering rooftop unit 301. However, as will be discussed in greater detail below, other factors must be considered as well such as the relative speed of the supply air fan. Controller 104 may optionally receive operating data back from exhaust fan 313 on control line 315 as well.

An outside air regulating assembly 319 is configured to regulate an outside air flow 320. As illustrated in FIG. 3, outside air regulating assembly 319 includes an adjustable closure 318, such as a controllable damper, having one or more louvers, fins, or vanes 329 to regulate at least and unconditioned air flow 321 of outside air flow 320. This unconditioned air flow 321 of outside air flow 320 enters primary enclosure 304 through a first outside air inlet 323 defined by a first outside air opening 324 in primary enclosure 304. Adjustable closure 318 includes an actuator to 17 responsive to controller 104 by control line 325 electrically connecting actuator 317 with controller 104 to both receive control signals from controller 104, and to send data signals back to controller 104 as well.

Outside air regulating assembly 319 further includes an outside air fan 327 inside primary enclosure 304 (here shown as part of a heat exchanger 353) positioned to regulate a preconditioned air flow 328 which represents the remaining portion of the outside air flow 320 not included in the unconditioned air flow 321. Preconditioned air flow 328 enters through a second outside air inlet 330 defined by a second outside air opening 331 in primary enclosure 304. Outside air fan 327 is responsive to controller 104 by control line 333 and may receive operating power from a standard power connection 334. As of the exhaust fan 313, outside air fan 327 may optionally send operational data back to controller 104 as well as receiving control signals from it.

In this embodiment of outside air regulating assembly 319, outside air fan 327 and adjustable closure 318 operate together to control unconditioned air flow 321 and preconditioned air flow 328. Outside air fan 327 adjusts the flow by creating positive pressure by pushing air into rooftop unit 301 while adjustable closure 318 relies on adjusting the flow of unconditioned air flow 321 created by the negative pressure from supply air fan 389. To reduce the flow of incoming air, controller 104 can, for example, send fan 327 reductions in speed, or shutdown commands, and send commands to actuator 317 to close adjustable closure 318 thus stopping unconditioned air flow 321 by closing off adjustable closure 318. It should be noted that although unconditioned air flow 321 will cease because adjustable closure 318 will be closed, some air may still move through preconditioned air flow 328 and possibly even opposite exhaust air flow 311 depending on the relative strength of the negative pressure created by supply air fan 389.

Outside air flow 320 enters the first and second outside air inlets 323 and 330 through an outside air hood inlet 336 defined by an outside air opening 338 in outside air hood 339. Outside air hood 339 is mounted to primary enclosure 304. Exhaust air flow 311 also passes out of exhaust outlet 312 and through an exhaust hood outlet 347 in an exhaust hood 344 which is also mounted to primary enclosure 304. Exhaust hood outlet 347 is defined by an exhaust hood opening 346.

Also included in the embodiment illustrated in FIG. 3 is a heat exchanger 353 positioned inside the primary enclosure 304 to allow exhaust air flow 311 and preconditioned air flow 328 to pass one another within a heat exchange cassette or block 354. In one embodiment, the heat exchange cassette 354 is rotatably mounted in heat exchanger 354 to rotates around a central axis of rotation 355. Heat exchanger 354 is responsive to controller 104 by a control line 358 which actuates a drive assembly 359. Drive assembly 359 rotates heat exchange cassette 354 around the axis of rotation 355 when signaled to do so by controller 104. Controller 104 may optionally receive control signals back from heat exchanger 354 indicating data about its operational state as well. Drive assembly receives power from a standard power connection 377.

Heat exchanger 354 operates to recover energy that might otherwise be lost in the process of expelling exhaust air flow 311. The exchanger shown in FIG. 3 includes two air flow paths passing one another within a heat exchanger having a fluid permeable cassette configured to allow both air flows to pass through the cassette simultaneously in opposite flow paths. If, for example, preconditioned air flow 328 is warmer than exhaust air flow 311 (in other words the inside air is cooler than the outside air), then exhaust air flow 311 will cool the half of the rotating cassette 354 that intersects exhaust air flow 311 and cool that part of the cassette as it rotates by. The now cooled portions of the cassette then rotate around to intersect outside air flow 328. Outside air flow is then cooled while the portion of the cassette now intersecting outside air flow 328 is warmed. This process repeats as the rotating cassette 354 continues transferring energy from one flow of air to the other as the two air flows pass one another in the heat exchanger moving in opposite directions. In this way the temperature of the outside air flow 328 can be moderated with respect to the exhaust air flow 311, regardless of which one is warmer or cooler, thus recapturing some of the energy about to be lost by expelling exhaust air flow 311 into the outside.

As air exits heat exchanger 353, it mixes with other air flows entering a mixing region 360 which is defined by and also contained within the primary enclosure 304. The result is preconditioned air flow 328 passing into mixing region 360 along with outside air flow 321, and recirculated air flow 310 combining to form mixed air flow 362 which passes from the mixing region 360 into a separate temperature adjusting region 364.

Mixed air flow 362 passes into temperature adjusting region 364 within primary enclosure 304 through a mixed air flow inlet 365 defined by a mixed air flow opening 366. Mixed air flow 362 passes through mixed air flow inlet 365 and through a mixed air filter 368. Mixed air filter 368 is constructed, configured, and positioned similarly to air filter 129 in rooftop unit 101 and operates in a similar manner to capture debris, dust, and other foreign objects to keep them from circulating throughout enclosed space 200 and rooftop unit 301.

Similar to rooftop unit 101, temperature adjusting region 364 includes one or more temperature adjusting units 370 and 371 configured to raise or lower the temperature of mixed air flow 362 before mixed air flow 362 enters the enclosed space 200. Examples of temperature adjusting units are shown and include a heating unit 370 and a cooling unit 371. Heating unit 370 and cooling unit 371 are constructed, configured, and controlled like heating unit 130 and cooling unit 133 in rooftop unit 101. Heating unit 370 includes a power connection 373 which is connected to a standard power connection. Likewise cooling unit 371 includes a power connection 374 also connected to a standard power connection. As with heating unit 130 and cooling unit 133, controller 104 receives operational updates from heating unit 370 through control line 375, but in the embodiment shown does not send control signals to heating unit 370. On the other hand, controller 104 both sends control signals and receives information from cooling unit 371 are responsive to controller 104 through control line 376.

Rooftop unit 301 also includes one or more ionization devices 378 which are constructed, configured, and operated similarly to ionization devices 142 shown in FIG. 1 and described above. As with ionization devices 142, ionization devices 378 may include multiple ionization elements of varying types, and may be positioned in one or more places within rooftop unit 301 designated 378A, 378B, and 378C. Multiple ionization devices may be positioned within rooftop unit 301 as discussed above with respect to rooftop unit 101. An ionization power connection 380 is also shown for providing power to the one or more ionization devices 378. Regardless of the location, ionization device 378 is responsive to controller 104 through control line 382. An ionization power connection 380 is also coupled to ionization device 378, regardless of the number of ionization devices and their locations. As with the embodiment shown in FIG. 1 and described above, one or more ionization devices 378 may optionally be installed at all designated locations, or at any other location within the primary enclosure 304 suitable for ionizing air. In the illustrated embodiment, ionization unit 378 is positioned so that mixed air flow 362 passes over and around and through ionization device 378 to maximize its effect on mixed air flow 362. However, other ionization devices 378 may also be positioned to intercept other air flows such as outside air flow 321, preconditioned air flow 328, or recirculated air flow 106 in addition to, or instead of mixed air flow 362.

As discussed above with respect to roof top unit 101, adding an ionization device 378 to roof top unit 301 results in a reduced thermal load on the system. Cleaning VOCs from the air rather than diluting them with outside air flow 320 results in a reduction in the capacity required for blowers, heating and cooling units, dampers, and vents, as well as an overall reduction in capital expense and ongoing operational and maintenance expenses. For example, in the embodiment shown in FIG. 3, the size or capacity of heat exchanger 353 may be reduced by ionizing the air inside rooftop unit 304. By removing or reducing the concentration of harmful contaminants from the air, a smaller size heat exchanger 353 may be used with rooftop unit 301 either when the unit is first constructed, or when the heat exchanger is added later (for example see FIGS. 4 and 5). In some cases heat exchanger 353 represents a significant portion of the overall purchase price of a rooftop such as the one shown. Therefore, reducing the capacity of this device may result in a significant overall cost savings.

For example, with ionization active in roof top unit 304 actively cleaning the air, outside air flow 320 need not be brought in to dilute saturations of airborne contaminants at all in some cases. In many situations, vanes 329 can remain closed while preconditioned air flow 328 is also reduced by two thirds less than what it would be if no ionization dive 378 were active. In one example, preconditioned airflow 328 may be reduced from 15 cubic feet per minute to 5 cubic feet per minute per occupied load where "per occupied load" means per person occupying the enclosed space. For example, if a restaurant has a maximum rated capacity of 100 people, then the heat exchanger, without ionization active, must be capable of providing about 15 cubic feet per minute of air through precondition air flow 328 per person at maximum capacity, or up to 1500 cubic feet per minute. With ionization on, less outside air is required to maintain required air quality due to the active removal of contaminants such as VOCs. Therefore, for example, when ionization device 378 is active, unconditioned air flow 321 can, in some cases, be reduced to about zero, while preconditioned air flow 328 can be reduced to about 5 cubic feet per minute or less depending on occupancy. Controller 104 senses the saturation of contaminants in enclosed space 200 and can adjust outside air fan 327 to deliver the reduced level of preconditioned air such as 1 cubic foot per minute if the building occupancy is low, or 3 or 5 or more cubic feet per minute per person as necessary as occupancy grows or air quality changes. However, this is still significantly less than the 10 or 15 or more cubic feet per minute per person required to maintain proper air quality without ionization.

System 300 illustrated in FIG. 3 also includes a supply air regulating assembly 385 configured to introduce the supply air flow 102 into enclosed space 200 through the supply air outlet 386 defined by a supply air opening 387 in the primary enclosure 304. Supply air regulating assembly 385 may include a supply air fan 389 mounted within primary enclosure 304. In the illustrated embodiment, supply air fan 304 sends operational information to controller 104 through control line 390, but controller 104 does not send control signals to supply air fan 389. Supply air fan 39 draws operating power from a standard power connection 391.

Similar to rooftop unit 101, the overall regulation of outside air in rooftop unit 301 is accomplished by an outside air assembly composed of multiple fans and adjustable closures. In rooftop unit 301, the control of outside air is achieved by various combinations of least four factors: (1) the negative pressure created by supply air fan 389 pushing supply air flow 102 out of rooftop unit 301 and into enclosed space 200, (2) the positive pressure created by outside air fan 327 pushing preconditioned air flow 328 into rooftop unit 301, and (3) the actuation of adjustable closure 318 allowing entry of the unconditioned air flow 321 caused by negative pressure from supply air fan 389, and (4) the added negative pressure created by exhaust air fan 313. As noted above, in the illustrated embodiment, adjustable closure 318, outside air fan 327, and exhaust air fan 313 are all responsive to controller 104 receiving direct commands indicating to what extent their behavior should be adjusted depending on control logic and sensor input. Also as noted previously, controller 104 receives information from supply air fan 389 but does not directly control its speed or other operational characteristics.

In one example, as the speed of supply air fan 389 is increased, controller 104 will detect this change, and automatically respond by actuating adjustable closure 318 to reduce unconditioned air flow 321 (by narrowing vanes 329). Controller 104 may also send signals to outside air fan 327 to reduce preconditioned air flow 328 thus maintaining the proper balance and air flow pressure throughout the enclosed space 200 and rooftop unit 301. In another example, if supply air fan 389 is controlled to reduce speed thus reducing supply air flow 102, controller 104 will also read this adjustment from control line 390 and actuate adjustable closure 318 to increase unconditioned air flow 321 (for example, by opening vanes 329) to make an adjustment to increase the speed of outside air fan 327 by sending signals on control line 333.

Similarly, the return air regulating assembly includes multiple components under the control of controller 104. As return air flow 103 enters rooftop unit 301, the recirculated air flow 310 and the exhaust air flow 311 are apportioned based primarily on the negative pressure created by supply air fan 389 and the negative pressure created by exhaust fan 375. If, for example, the negative pressure created by exhaust fan 375 at return air inlet 393 is much higher in comparison with the negative pressure created by supply air fan 389, exhaust air flow 311 will represent a much larger portion of return air 103 than recirculated air flow 310. Likewise, if exhaust fan 375 creates a relatively small negative pressure in relation to the negative pressure created by supply air fan 389, then the relative portion of return air flow 103 entering mixing region 360 as recirculated air flow 310 will be significantly larger than the exhaust air flow 311. By regulating the speed of fans 327 and 375, and adjusting vanes 329, controller 104 can effectively respond to changes in the behavior of the supply air fan to regulate the flow of outside air entering roof top unit 301.

Rooftop unit 301 also includes a similar set of sensors as discussed with respect to rooftop unit 101 which provide a variety of data signals to controller 104. Also included is a supply air sensor 398 in fluid communication with supply air 102 configured to measure temperature and optionally other properties of supply air flow 102 passing the supply air data back to controller 104 through a control line 399. Rooftop unit 301 also includes an optional sensor mounting location 372 for mounting sensor 214 within outside air hood 339. As with rooftop unit 101, one optional mount is shown in FIG. 3, however, the position of location 372 may be adjusted as necessary to suit the needs of the particular embodiment of system 300, and more than one sensor may be used as well.

Figure 4:
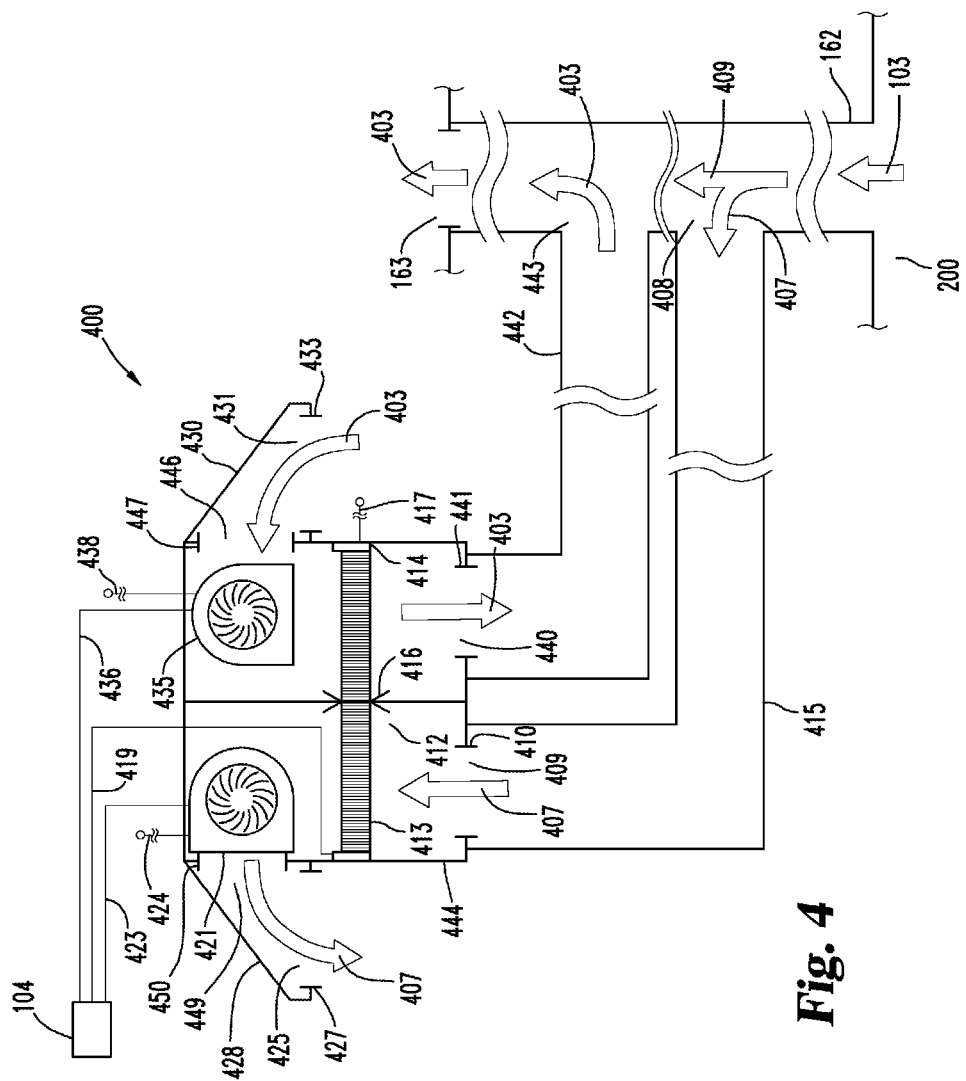
FIG. 4 illustrates a diagrammatic view of another embodiment of a heat exchanger similar to the heat exchanger shown in FIG. 3.

FIG. 4 illustrates another embodiment of a heat exchanger unit operating in similar fashion to the heat exchanger unit shown in FIG. 3 but arranged outside primary enclosure 180 or 304. As illustrated at 400, a heat exchanger 412 exchanges heat between an exhaust air flow 407 and a preconditioned air flow 403 as discussed previously with respect to heat exchanger 353 thus reducing the thermal load on the heating, ventilating, and air conditioning system. He exchanger like the one shown in FIG. 4 at 400 may be used in conjunction with a roof top unit such as unit 103 which does not have a heat exchanger directly coupled to it or built into its primary enclosure.

As shown at 400 in FIG. 4, return air flow 103 enters return air duct 162 from enclosed space 200. Return air flow is divided into an exhaust air flow 407 and a recirculated air flow 409 at a location 408. Exhaust air flow 407 passes through exhaust duct 415 and enters heat exchanger 412 at an exhaust inlet 409 defined by an exhaust opening 410 in a primary enclosure 444. Heat exchanger cassette 413 is rotatably mounted on an axis of rotation 416 within primary enclosure 444 and is rotated around axis 416 by a drive assembly 414. Drive assembly 414 is responsive to controller 104 by a control link 419 and receives operating power standard power connection 417. Controller 104 may optionally also receive signals from drive assembly 414 as well.

Exhaust air flow 407 is pulled through one side of heat exchanger cassette 413 by negative pressure created by exhaust air fan 421 mounted to primary enclosure 444 which is responsive to controller 104 by a control link 423 and receives operating power from a standard power connection 424. Exhaust air flow 407 escapes into the outside air through an exhaust air outlet 449 defined by an exhaust air opening 450 and through an exhaust hood outlet 425 defined by an exhaust hood opening 427 in an exhaust hood 428.

Preconditioned air hood 430 has a preconditioned air inlet 431 defined by preconditioned air opening 433. A preconditioned air fan 435 is mounted to primary enclosure 435 to receive the preconditioned air flow 403 of outside air through a precondition air inlet 446 defined by a preconditioned air opening 447. Preconditioned air fan 435 is responsive to controller 104 by control line 436 and receives power from a standard power connection 438. Controller 104 may optionally receive data signals preconditioned air fan 435 as well.

Preconditioned air flow 403 is pushed through heat exchange cassette 413 by positive pressure from preconditioned air fan 435 of heat exchanger 412 and exits energy recovery unit 400 through preconditioned air outlet 440 defined by preconditioned air opening 441 in primary enclosure 444. Preconditioned air flow 403 then rejoins recirculated air flow 409 through preconditioned air duct 442 at a point 443 upstream from return air inlet 163 and downstream from location 408 where return air flow 406 separated into exhaust air flow 407 and recirculated air flow 409.

It can be observed from FIG. 4 that preconditioned air fan 435 and exhaust air fan 421 can operate as part of a return air regulating assembly as illustrated in FIG. 1. For example, the heat exchanger of FIG. 4 could be optionally coupled to rooftop unit 101 by coupling the return air duct 162 of FIG. 4 to return air duct 162 shown in FIG. 1. With this arrangement, as the flow of fans 421 and 435 increase, return air 103 is substantially replaced by preconditioned air flow 403. However, if exhaust fan 421 and preconditioned fan 435 are shut down, return air flow 103 could be created, for example, by the operation of supply air fan in rooftop unit 101 and in that instance it would include essentially only return air from the enclosed space. Thus it can be seen that fans 421 and 435 can operate as part of the return air regulating assembly of a rooftop unit such as the one illustrated in FIG. 1 as well as others.

Figure 5:
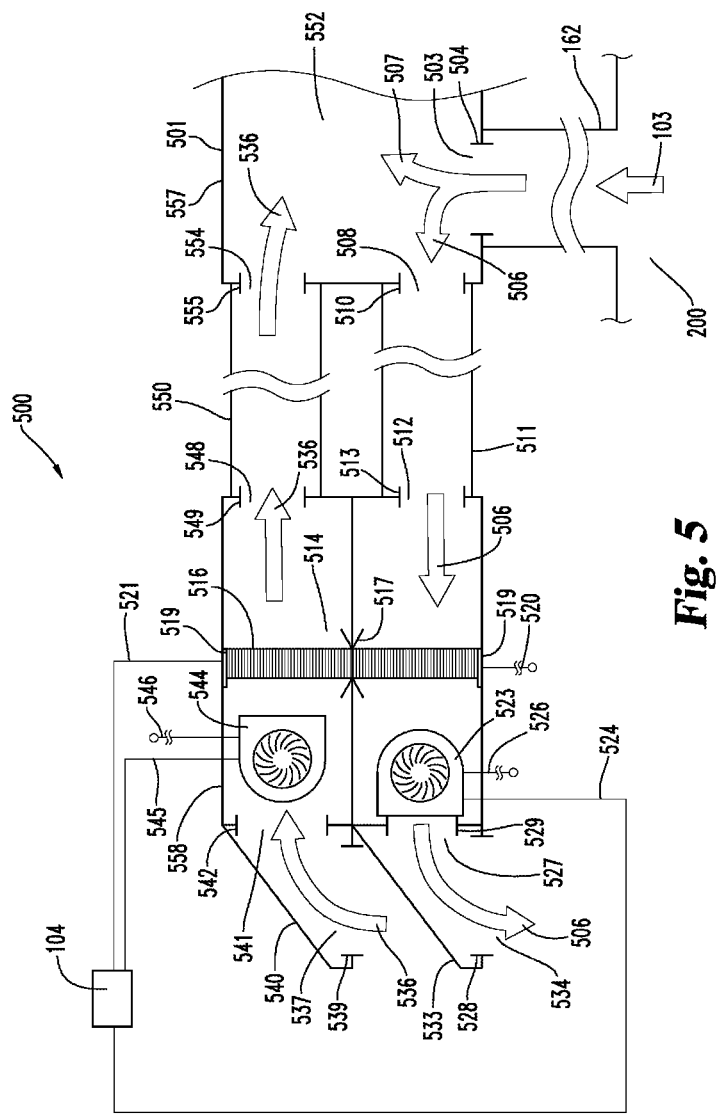
FIG. 5 illustrates a diagrammatic view of yet another embodiment of the heat exchanger similar to the heat exchanger shown in FIGS. 3 and 4.

FIG. 5 illustrates another embodiment of a system for conditioning air 501 similar to the embodiment illustrated in FIG. 3 but with a heat exchanger arranged in a separate enclosure and configured differently from the one shown in FIG. 4. In FIG. 5, return air flow 103 enters return air duct 162 from enclosed space 200 and enters a roof top unit enclosure 557 which is similar in construction and function to primary enclosure 180 described above and shown in FIG. 1. Return air flows through a return air inlet 503 defined by return air opening 504 in roof top unit enclosure 557. Return air 103 divides into an exhaust air flow 506, and a recirculated air flow 507 within the roof top unit enclosure 557.

Exhaust air flow 506 enters exhaust air duct 511 through exhaust air outlet 508 defined by an exhaust air opening 510 in roof top unit enclosure 557 and enters heat exchanger 514 through exhaust air inlet 512 defined by exhaust air opening 513 in an heat exchanger primary enclosure 558. Exhaust air flow 506 passes through heat exchanger 514 mounted within heat exchanger primary enclosure 558. Heat exchanger 514 having a heat exchanger cassette 516 rotating about a central axis of rotation 517. Heat exchanger cassette 516 is rotated by a drive assembly 519 which receives operating power from a standard power connection 520, and is responsive to controller 104 by a control line 521. Drive assembly 519 may also optionally send operational states back to controller 104 over control line 521.

Exhaust air flow 506 is created by exhaust air fan 523 which is responsive to controller 104 by control line 524 and may optionally send signals to controller 104 as well. Exhaust air fan 523 receives operating power from a standard power connection 526 and is configured to expels exhaust air flow 506 into the outside air through exhaust air outlet 527 defined by exhaust air opening 529 in heat exchanger primary enclosure 558. Exhaust air flow 506 moves through an exhaust air hood outlet 531 defined by an exhaust opening 528 in an exhaust air hood 533 mounted to the heat exchanger primary enclosure 558.

A preconditioned air flow 536 enters the preconditioned air flow hood 540 mounted to the heat exchanger primary enclosure 558. Preconditioned air flow 536 enters at a preconditioned hood inlet 537 defined by a preconditioned air flow opening 539. Preconditioned air flow 536 enters heat exchanger 514 at a preconditioned air flow inlet 541 defined by preconditioned air flow inlet opening 542 in heat exchanger primary enclosure 558. The preconditioned air flow created or assisted by preconditioned air fan 544 responsive to controller 104 by control line 545 and receiving power from standard power connection 546. Here again, preconditioned air fan 544 may also optionally send operational states back to controller 104 over control line 545 as well.

Preconditioned air flow 536 passes through heat exchange cassette 516 and exits heat exchanger 514 through a preconditioned air flow outlet 548 defined by the preconditioned air flow opening 549 in heat exchanger primary enclosure 558. Preconditioned air flow 536 passes into a preconditioned air duct 550 where it is delivered into mixing region 552 within roof top unit enclosure 557. Preconditioned air flow 360 enters mixing region 552 through a preconditioned air flow inlet 554 defined by preconditioned air flow opening 555 in roof top unit enclosure 557. The mixed air flow then proceeds into a temperature adjusting region as described above with respect to FIGS. 1 and 3.

As with the embodiments illustrated in FIGS. 1 and 3, the outside air regulating assembly and return air regulating assembly are somewhat more complex in the embodiment shown in FIG. 5. Exhaust fan 523 and preconditioned air fan 544 operate together along with the supply air fan (examples shown and discussed above) to regulate the mixture of return air 103 and outside air (in this case embodied as preconditioned air flow 536) entering mixing region 552. The flow rates of these three fans can be properly balanced by controller 104 to attain the proper mixture of inside and outside air with the proper pressure in the enclosed space. For example stopping fans 544 and 523 and running only the supply air fan would result in virtually all of return air flow 103 being recirculated back into the enclosed space 200. On the other hand, if the supply air fan speed is increased, controller 104 will notice this change and adjust preconditioned air fan 544 to reduce its speed while potentially increasing the speed of exhaust fan 523 to maintain proper pressures throughout the system. However, in doing so, this will have the effect of pushing more air out of the enclosed space and replace it with outside air.

Turning now to the control logic involved in regulating systems like the ones illustrated in FIGS. 1 through 5, one embodiment of the control logic for operating a unit like the one illustrated in FIG. 1 is illustrated in FIGS. 6 through 11. Controller 104 includes one or more processors, logic circuits, memory circuits, data inputs and outputs, and other circuitry or suitable devices storing the necessary data and performing the required operations as discussed above, illustrated and discussed below.

Figure 6:
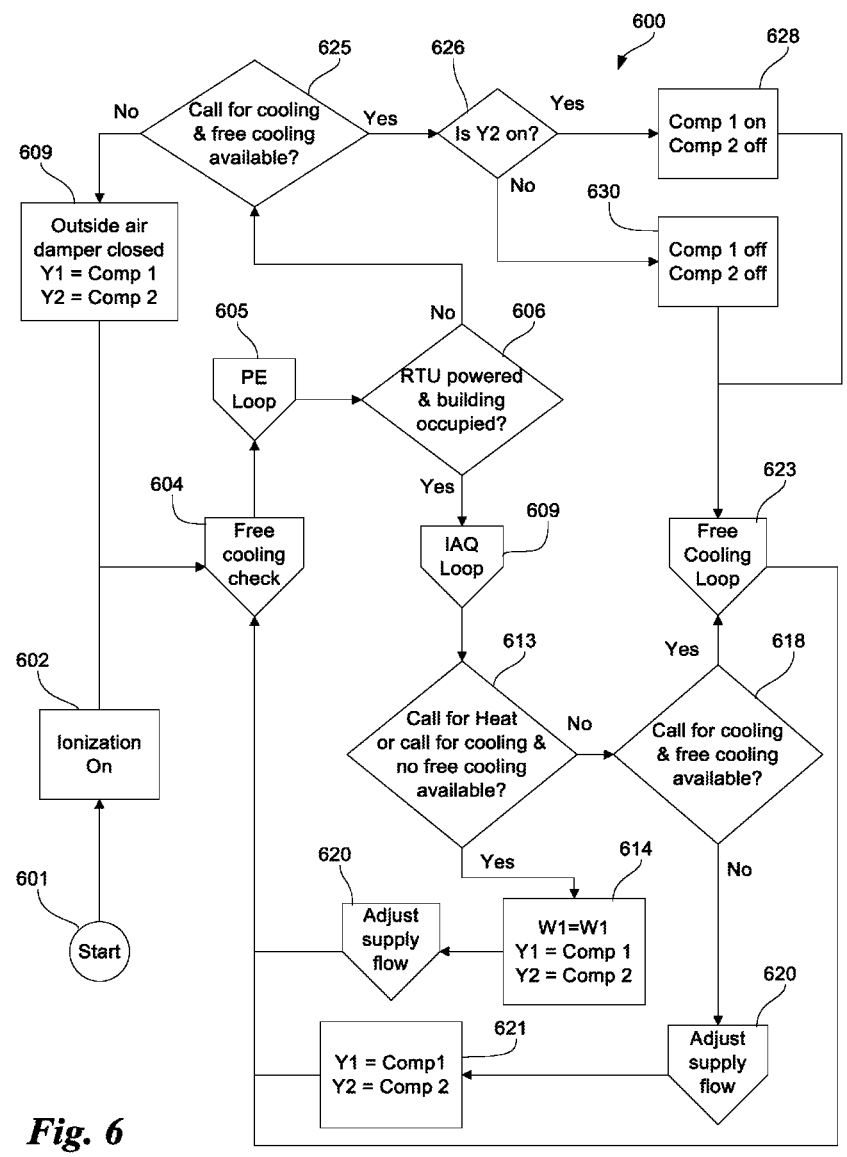
FIG. 6 illustrates one embodiment of a sequence of operations for a controller controlling a unit like the one shown in FIG. 1.

In FIG. 6, one embodiment of the overall control flow for operating a unit similar to roof top unit 103 is illustrated. In the embodiment show, the controller can operate to regulate the introduction of outside air to reduce the temperature of the enclosed space without activating any temperature adjusting devices such as a heating or cooling unit. In one embodiment, it performs this function by controlling adjustable closures such as dampers to decrease or increase the amount of outside air being brought into the enclosed space. The amount of outside air required is be reduced, however, because of the active air contaminant reduction occurring with the ionization device.

As shown in FIG. 1, operations begin at (601) with powering up the ionization. Ionization may be always active when power is applied to the rooftop unit, or ionization may be activated by controller 104 as needed, and then possibly regulated to some extent afterward, or simply left in the present "on" state.

A free cooling check is executed at 604 to determine if free cooling is available (604). One embodiment of the actions involved in the free cooling check are described in FIG. 7 and illustrated at 700. Control moves from 701 to 703 where the controller compares the outside air temperature retrieved from a sensor (for example, outside air sensor 214) with a preset EconHighTmpLimit setpoint saved in the controller's memory. If the outside air temperature is greater than or equal to this setpoint, free cooling is not available, and the controller saves this result for future use (710). In the one embodiment, this value can be adjusted by the operator to control the highest outside air temperature for which free cooling is allowed. The free cooling check is then complete (712).

If the outside air temperature is less than the EconHighTmpLimit setpoint (704), the controller then compares the outside air temperature to the EconLowTmpLimit setpoint. If the outside air temperature is less than this setpoint, free cooling is not available, and the controller saves this result for future use (710). This value may also be adjusted by the operator to control the lowest outside air temperature for which free cooling is allowed. The free cooling check is then complete (712).

However, if the outside air temperature is greater than or equal to the EconLowTmpLimit setpoint (704), the controller determines if any outside enthalpy or humidity sensor data is available from an enthalpy or humidity sensor (706). Although the controller can accept such inputs as discussed above, these signals are optional for the embodiments disclosed. If no outside enthalpy or humidity data is available, the controller saves a data value, or set a control value, or performs a similar function to indicate for future processing that free cooling is available (709) and free cooling is complete. If an enthalpy or humidity sensor is present, the controller determines whether the enthalpy and humidity sensors agree that free cooling is available (708) and save the corresponding result for future processing (709, 710). Having determined a final result, the free cooling check exits and processing returns to the calling procedure, 604 in FIG. 6 in this case.

With the availability of free cooling determined, the controller activates the powered exhaust loop (605) while also continuing to 606. One embodiment of the powered exhaust loop is detailed in FIG. 8 at 800 where a determination is first made of whether building pressure (BP) control is available (803). If so, the controller initiates a building pressure loop that continuously monitors building pressure by checking if the building pressure is currently at the building pressure setpoint. If so, Proportional Integral Differential (PID) processing occurs (814) with respect to the building pressure setpoint and the current building pressure. This loop is repeated at 813. In some embodiments, only the Proportional and Differential aspects of PID processing may be implemented, or possibly other combinations depending on the desired behavior.

If the building pressure is not equal to the building pressure setpoint (813), then the controller reduces the speed of the powered exhaust fan (817) if the building pressure is above the building pressure setpoint (817) and increases the speed of the powered exhaust fan if the building pressure is below the building pressure setpoint.

If building pressure control is not available (803), the controller determines if the outside air damper (for example vanes 115 in FIG. 1) is greater than a preset damper position PE1 indicating that outside air damper is already beyond a point where a first level of powered exhaust is needed (805). If this is true, a first level of powered exhaust is activated (808), and the controller determines if the outside air damper is at a position where a second level of powered exhaust is needed (809). If so, a second level of powered exhaust is initiated (812), and if not, the second level powered exhaust is deactivated (811). In either case, processing resumes at 805. If the outside air damper never was in a position where the first level of powered exhaust was required (less than or equal to PE1 at 805), then both the first and second levels of powered exhaust are deactivated (806). The loop then continues again at 805 by checking the current outside air damper position. Whether the powered exhaust loop is damper based, or building pressure based, the embodiments of the powered exhaust logic illustrated in FIG. 8 run along with other processing logic as an independent procedural loop as long as power to the controller and the roof top unit are maintained.

With the powered exhaust loop running, the controller continues by determining whether the rooftop unit is powered and the building is occupied (606). If either of these conditions is false, the controller then determines at 625 whether a call for free cooling has been made and checks to see if the free cooling check at 604 determined that free cooling is available. If there is no call for free cooling, or free cooling is not available, then the controller closes the outside air damper causing outside air flow 114 to all but cease. The controller then also passes the current value of the first and second stage cooling control signals Y1 and Y2 (commonly received from the thermostat) to the cooling unit in the roof top unit and returns to check for free cooling. In this branch of control processing, the building is either not powered or not occupied and there is either no free cooling available or no call for it—in which case the outside damper is closed and any calls for cooling by the thermostat are passed along.

However, if a call for free cooling has occurred, and free cooling is available (625), controller determines whether a second stage cooling is requested (626) by examining the value of Y2. If the second stage cooling is not requested, the controller sends shutdown signals to the cooling unit deactivating first and second stage cooling (630) and engages the free cooling loop at 623. If the value of Y2 shows second stage cooling is currently active (626), the controller activates first stage cooling and deactivates second stage cooling (628) and control passes to the free cooling loop (623).

Figure 10:
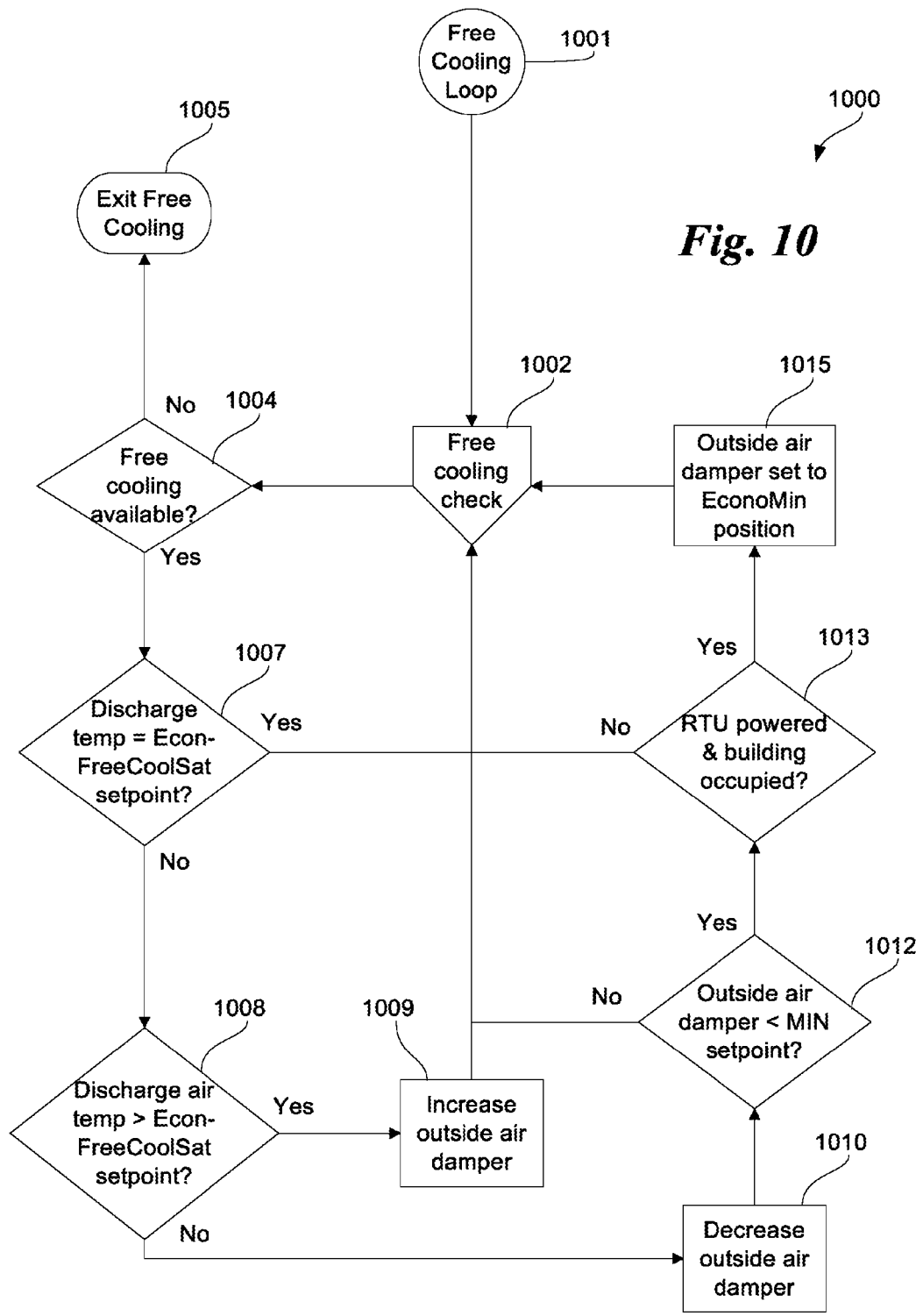
FIG. 10 illustrates one embodiment of another subset of operations for the control sequence shown in FIG. 6.

One embodiment of a free cooling loop control sequence used by a system such as the one illustrated in FIG. 1 is illustrated in FIG. 10. A free cooling check is first initiated at 1002 after the free cooling loop is entered at 1001. By checking conditions repeatedly, the controller keeps up to date as temperatures and other conditions change to ensure the free cooling loop does not continue when it should not. If free cooling is no longer available (1004), the loop exits at 1005. If free cooling is still available, the controller compares the discharge temperature with the EconFreeCoolSat setpoint. This is the mixed air temperature (sensed, for example, by the discharge sensor 173) the controller is seeking to maintain during free cooling. Therefore, if the discharge air temp is above the EconFreeCoolSat setpoint (1008), the controller increases (opens) the outside air damper (1009) and the loop repeats (1002). If the discharge air is below this setpoint, the outside air damper is closed (decreased) (1010). Put more generically, if the discharge temperature is below the setpoint, the outside air regulating assembly reduces the outside air flow coming into the mixing region, and if the discharge temperature is above the setpoint, the outside air regulating assembly increases the outside air flow.

However, if the damper position is decreased (1010), the controller then compares the new outside air damper position to a minimum setpoint required by building codes. If the damper position is still greater than the minimum, the loop repeats at 1002. If the damper position is less than the minimum allowed by building codes, the controller must then determine if the roof top unit is powered and the building is occupied. If not, the loop continues at 1002, but if so, the outside air damper must be set to a code enforced minimum position (1015) before the loop can then continue at 1002. This free cooling loop will continue in this manner until 1004 results in a negative result causing the loop to exit (1005).

Figure 9:
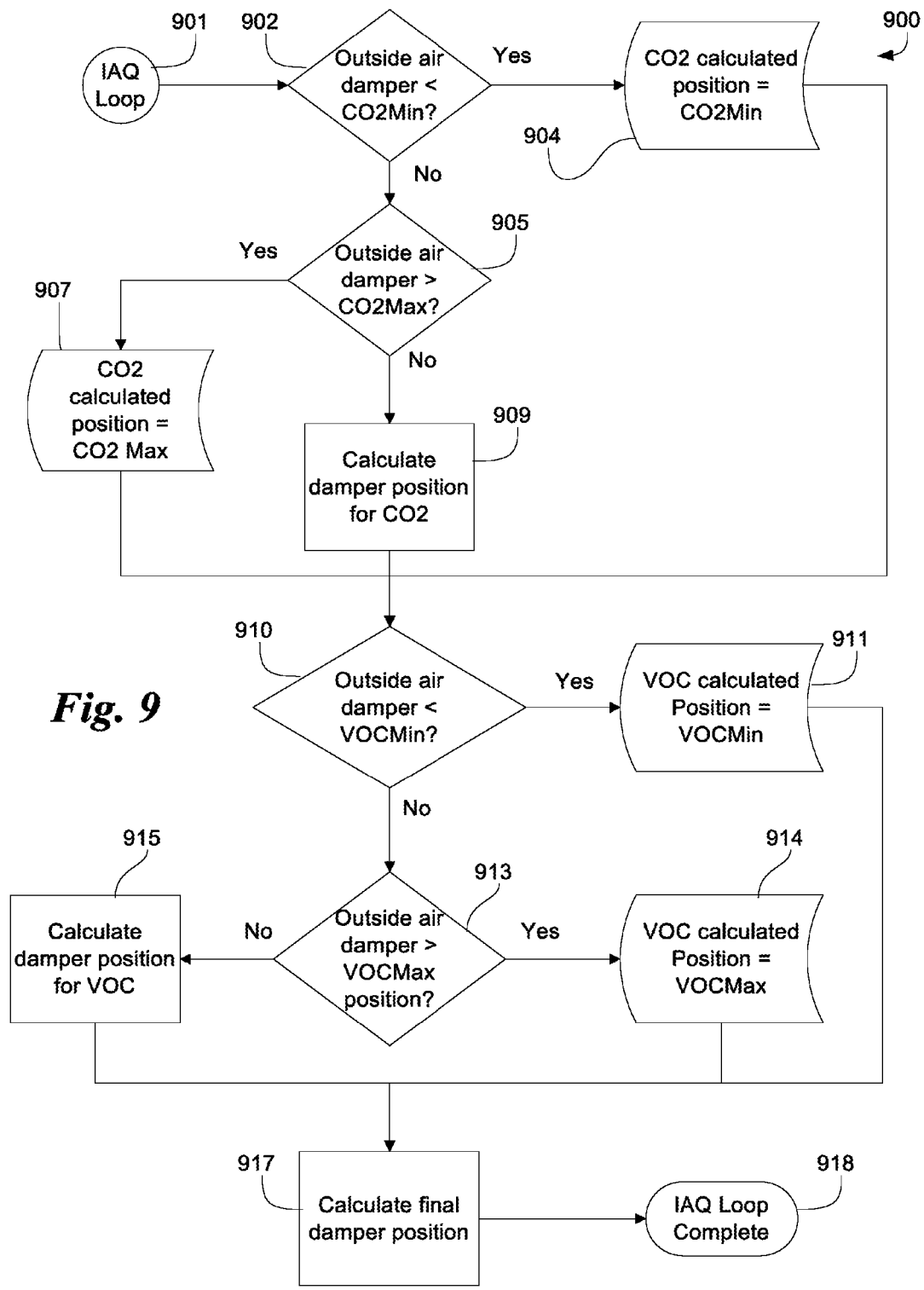
FIG. 9 illustrates one embodiment of another subset of operations for the control sequence shown in FIG. 6.

Returning to 606, if the roof top unit is powered, and the building is occupied, the IAQ loop is initiated (607) as shown in FIG. 9. One embodiment of an Indoor Air Quality (IAQ) control loop is illustrated in FIG. 9 that is useful for controlling a system like the one illustrated in FIG. 1. The control loop implements various operating parameter rules to create a set of operating parameters that will be used by the controller to control other parts of the system.

The controller determines if the outside air damper position is less than some CO2Min position (902) which determines the minimum quantity of fresh air the system must introduce in order to keep carbon dioxide levels under control in the enclosed space. If the damper position is less than the CO2Min position, the damper must be opened to at least CO2Min position (904) and the calculated damper position is set to CO2Min. If the damper is already open wider than the CO2Min position, the controller determines if the damper is open wider than CO2Max (905) which is the largest damper position setting necessary to maintain proper CO2 levels in the enclosed space. If so, the calculated damper position is set to CO2Max. If not, the controller calculates the proper damper position based on the current carbon dioxide saturation in the enclosed space (909) and adds the CO2 damper position to a set of operating parameters.

A similar procedure occurs with respect to calculating a damper position with respect to volatile organic compounds. If the current damper position is less than a VOCMin minimum setting (910), then the calculated VOC position is set to VOCMin position (911). If not, the controller determines if the outside air damper is open wider than the VOCMax position (913). If so, the VOC calculated position=VOCMax (914). If not, the controller calculates an appropriate damper opening based on the saturation of VOCs in the enclosed space (915) and adds the VOC damper position to the current set of operating parameters.

After both calculations are made, a final damper position is calculated (917) and added to the current set of operating parameters. In one embodiment of the algorithm, the calculated CO2 and VOC damper positions are added together to determine the final outside air damper position and the IAQ loop is complete (918). The controller maintains this final damper position in memory along with other operating parameters for controlling the other aspects of the system.

Processing continues in FIG. 6 at 613 where the controller determines if a call for heat has been made, or there is a call for cooling and there is no free cooling available. If both conditions are true, the controller passes through any thermostat signals for heat or cooling to the heating and cooling units (614), and adjust the supply air flow before returning to the free cooling check at 604.

Figure 11:
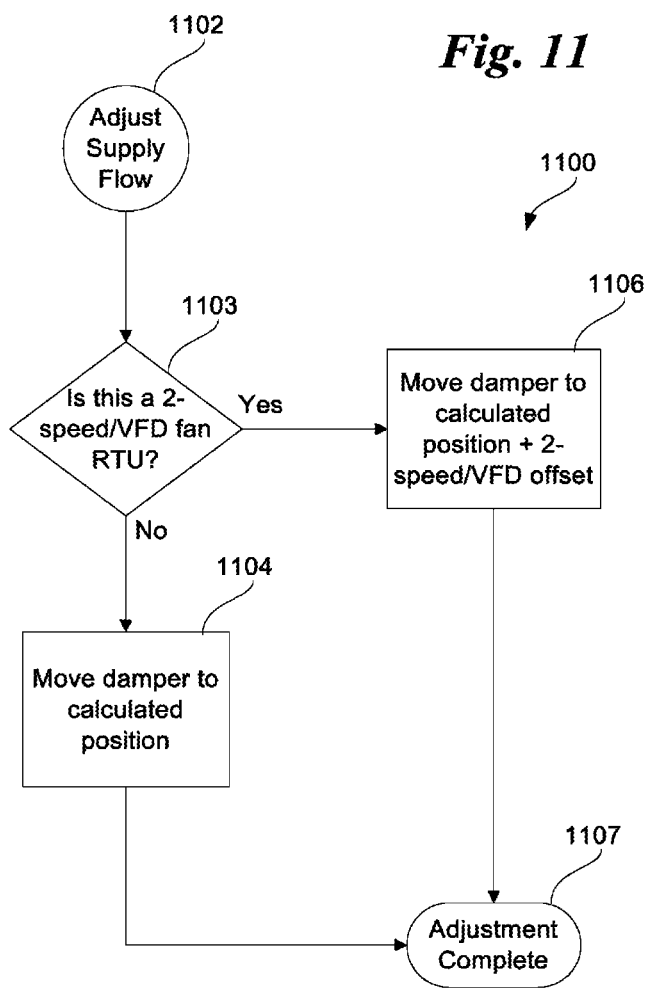
FIG. 11 illustrates one embodiment of another subset of operations for the control sequence shown in FIG. 6.

Adjustments to the supply air flow entering the enclosed space are illustrated in FIG. 11 where one embodiment of the control sequence is shown. The controller first determines if the supply air fan in this rooftop unit uses a 2-speed/Variable Frequence Drive (VFD) fan (1103). If so, the controller moves the outside air damper to the position calculated in the IAQ loop, and the adjusts the fan speed by a calculated offset as well (1106). If the rooftop unit does not use a 2-speed/VFD fan, then the controller adjusts the outside air damper position according to the calculated IAQ setting alone and the adjustment is complete (1107).

However, if at 613 one of the conditions was false, the controller determines if there was a call for cooling and free cooling is available (618). If both are true, the free cooling loop is entered as discussed above. If either condition is not true, the supply flow is adjusted discussed above with respect to FIG. 11, the first and second stage cooling signals from the thermostat are passed through to the cooling unit in the roof top unit, and processing repeats at 604, thus completing the full processing loop for a damper based ionizing unit monitoring indoor air quality.

Figure 12:
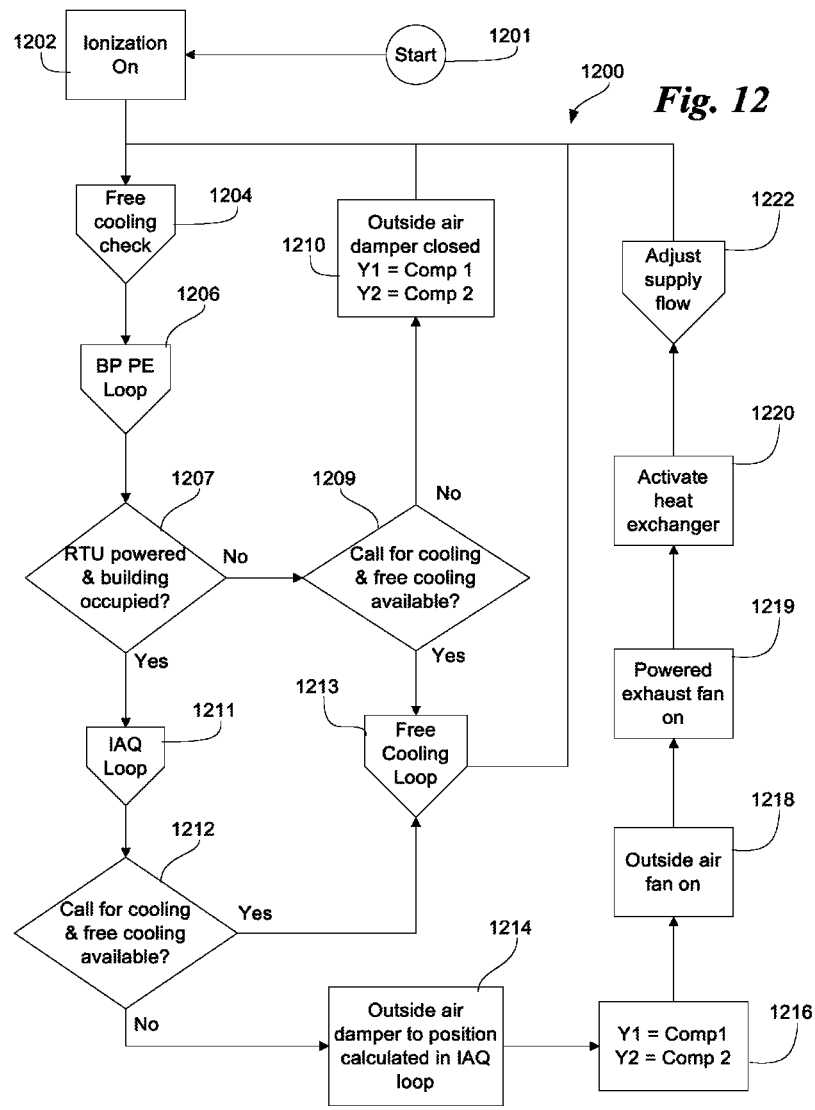
FIG. 12 illustrates one embodiment of a sequence of operations for a controller controlling a unit like the one shown in FIG. 3.

In FIG. 12, one embodiment of an overall control flow for operating a unit having a heat exchanger similar to roof top unit 303 is illustrated. However, the unit shown in FIG. 1 with a detached heat exchanger such as one of the units shown in FIG. 4 or FIG. 5 is envisioned as well. The control flow shown in FIG. 12 is an example of a control sequence for use with a heat exchanger of the minimum size required under applicable building codes. Such a unit would possibly be required to operate its outside air and exhaust fans almost constantly to maintain minimum indoor air quality standards. Although possibly requiring more energy to operate, the heat exchanger itself may costs significantly less thus resulting in an overall costs savings.

Operations begin at (1201) with powering up the ionization. As with FIG. 6, ionization may be always on when power is applied to the rooftop unit, or as discussed above, ionization may be activated by controller 104 as needed, and then possibly regulated to some extent afterward, or simply left in a present "on" state.

Figure 7:
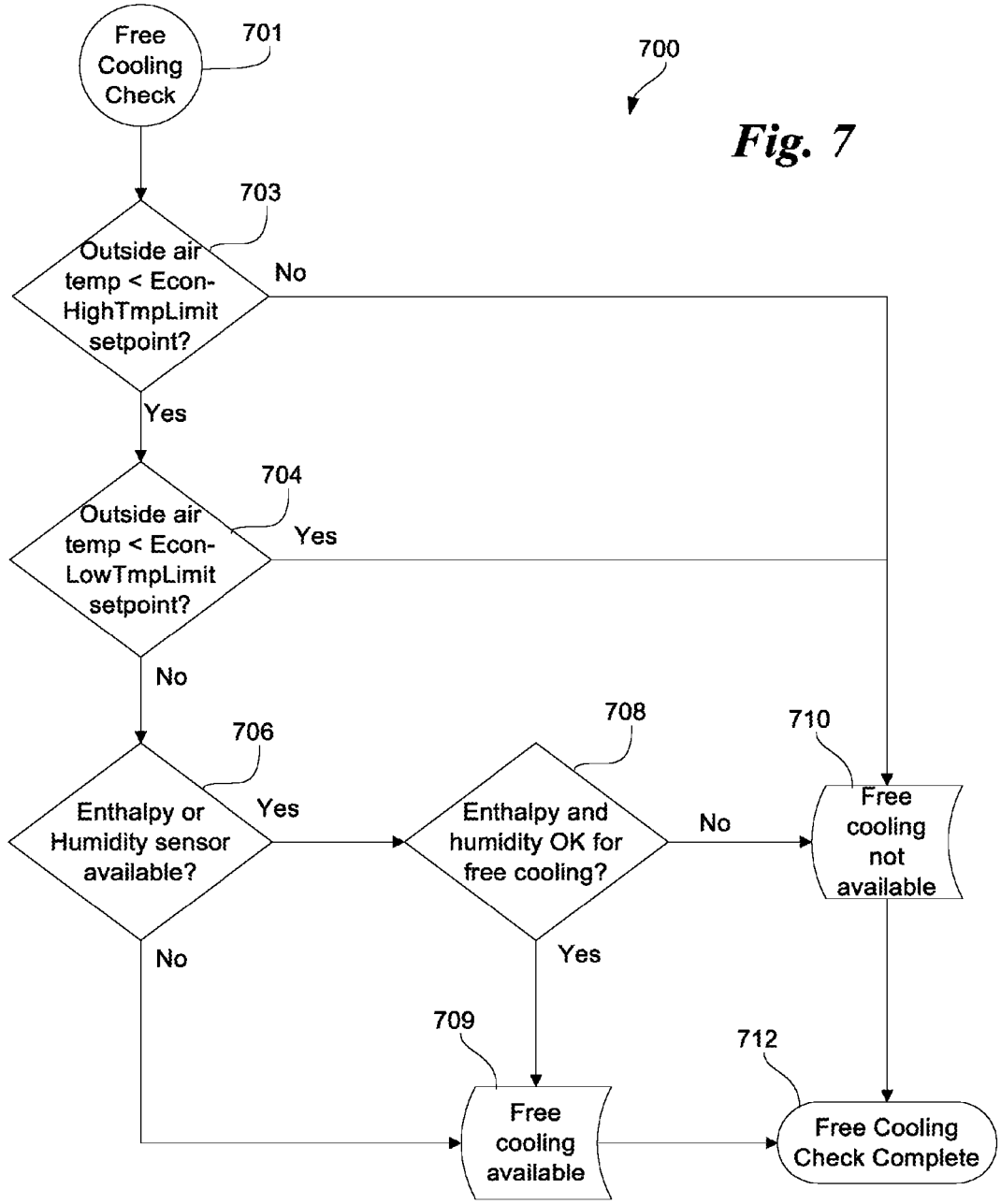
FIG. 7 illustrates one embodiment of a subset of operations for the control sequence shown in FIG. 6.
Figure 8:
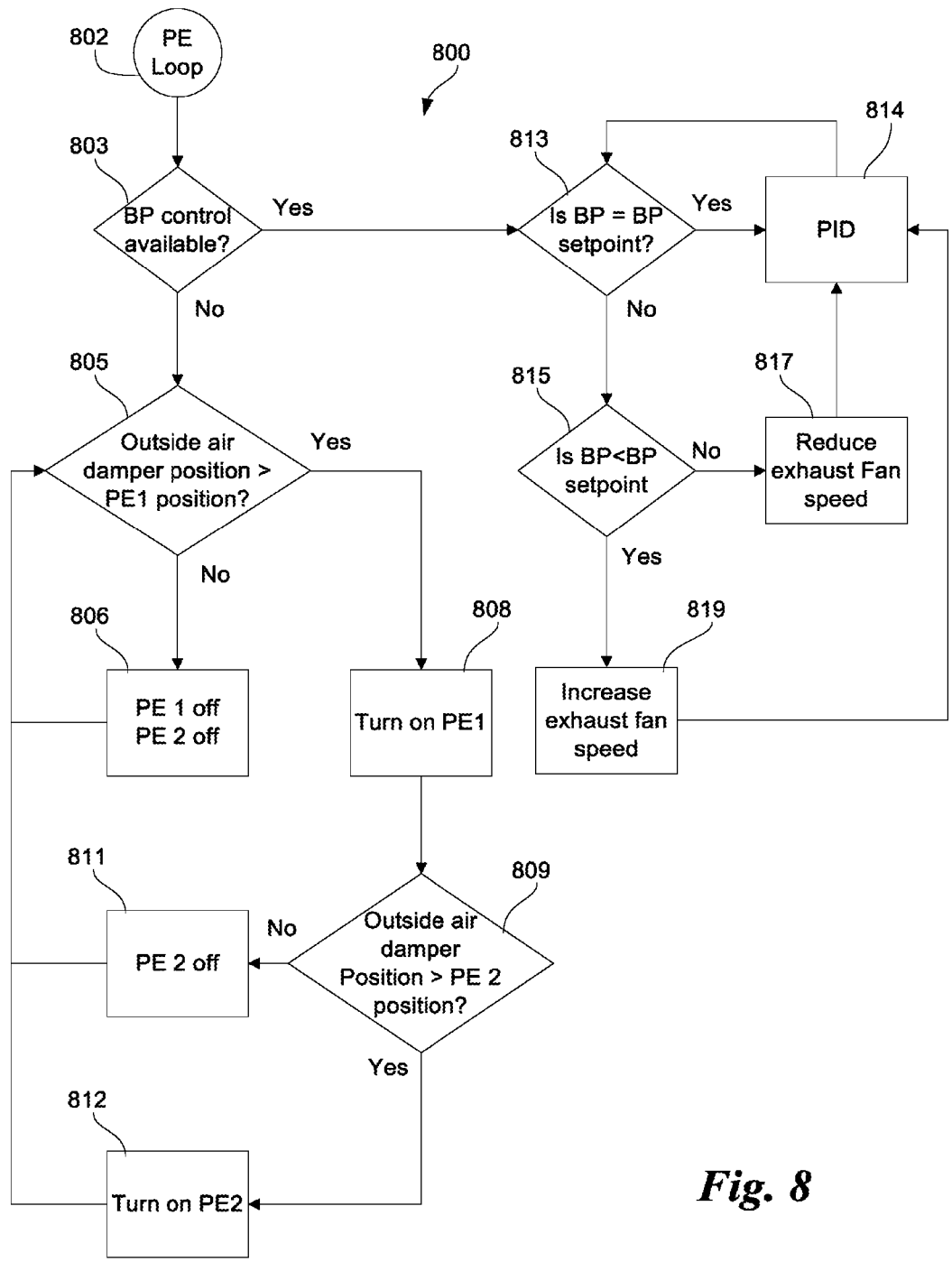
FIG. 8 illustrates one embodiment of another subset of operations for the control sequence shown in FIG. 6.

With ionization activated, a free cooling check is performed (1204) as illustrated in FIG. 7 at 700. A modified building pressure loop is the executed at 1206, the details of which are illustrated in FIG. 13.

Figure 13:
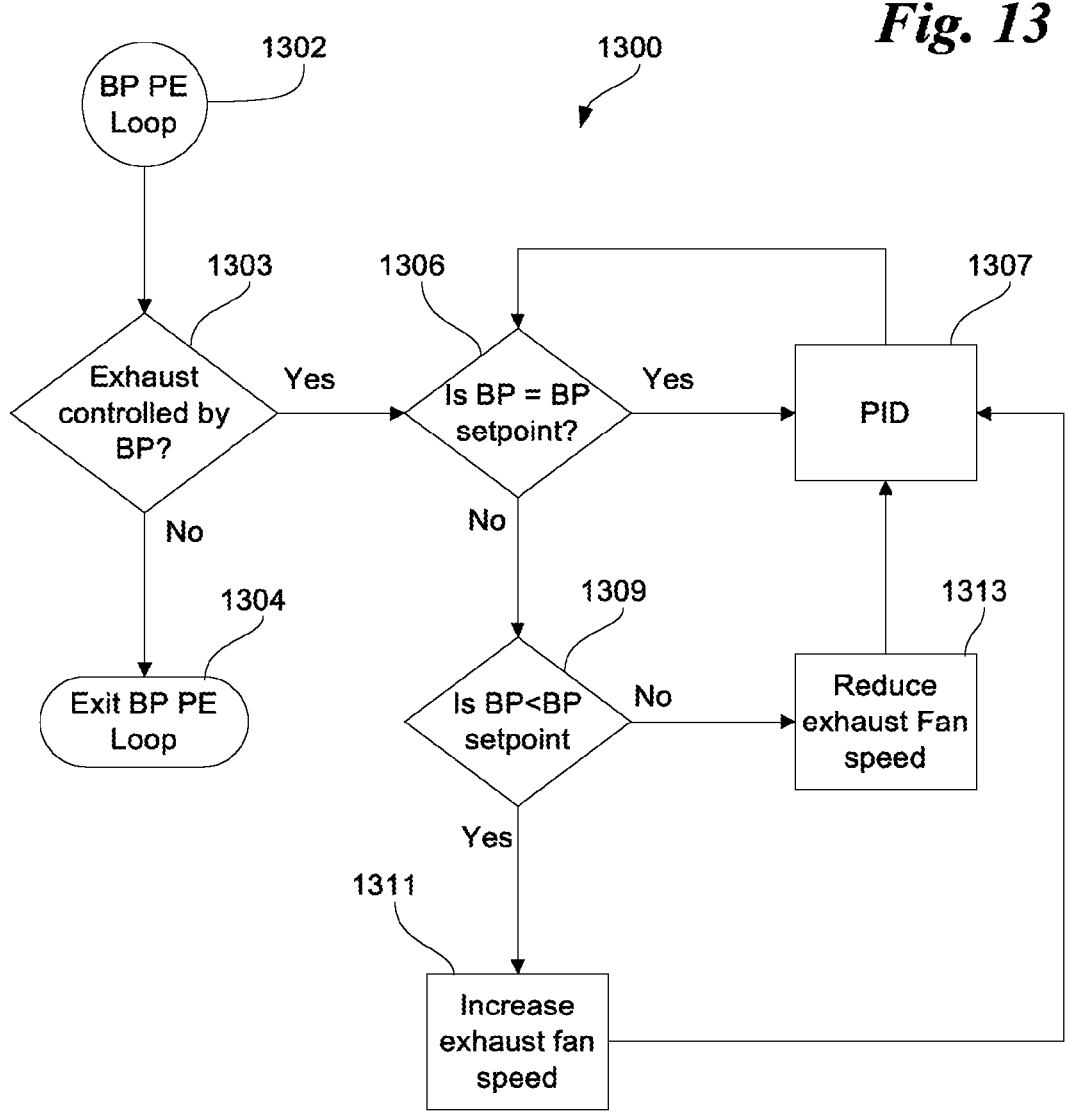
FIG. 13 illustrates one embodiment of a subset of operations for the control sequence shown in FIG. 12.

FIG. 13 illustrates an embodiment of a powered exhaust loop that includes building pressure controls alone, rather than controls for the outside air damper and powered exhaust fans as well. However, after the initial check to determine if the exhaust fan is controlled by building pressure (1303), the controller initiates a building pressure loop that in the illustrated embodiment is exactly like the loop shown in FIG. 8.

The controller continuously monitors building pressure by checking if the building pressure is currently at the building pressure setpoint. If so, Proportional Integral Differential (PID) processing occurs (1307) with respect to the building pressure setpoint and the current building pressure and the loop is repeated (1306). In some embodiments, only the Proportional and Differential aspects of PID processing may be implemented, or possibly other combinations depending on the desired behavior.

If the building pressure is not equal to the building pressure setpoint (1306), then the controller reduces the speed of the powered exhaust fan (1313) if the building pressure is above the building pressure setpoint (1309) and increases the speed of the powered exhaust fan (1311) if the building pressure is below the building pressure setpoint.

Returning to FIG. 12 at 1207 after initiating the building pressure powered exhaust loop, the controller determines if the rooftop unit is powered and the building is occupied. If either of these requirements fails to be true, the controller checks to see if there was a call for free cooling and free cooling is available (1209). If not, the outside air damper is closed, and the first and second cooling signals are passed through to the roof top unit cooling unit from the thermostat (1210). If so, the free cooling loop illustrated in FIG. 10 is entered (1213) and processing repeats.

However, if the RTU is powered, and the building is occupied (1207), the system enters the IAQ loop illustrated in FIG. 9. and described above and calculates a new damper position. At 1212 the controller determines if a call for cooling has occurred and whether free cooling is available. If so, the free cooling loop is entered. If not, the outside air damper is adjusted according to the position calculated in the IAQ loop (1211), the first and second stage call for cooling passed from the thermostat is passed along to the roof top cooling unit (1216), the outside air fan is activated (1218), the powered exhaust fan is activated (1219), the heat exchanger is activated (1220), and the supply flow is adjusted (1222) according to FIG. 11. The control logic then repeats from 1204.

Figure 14:
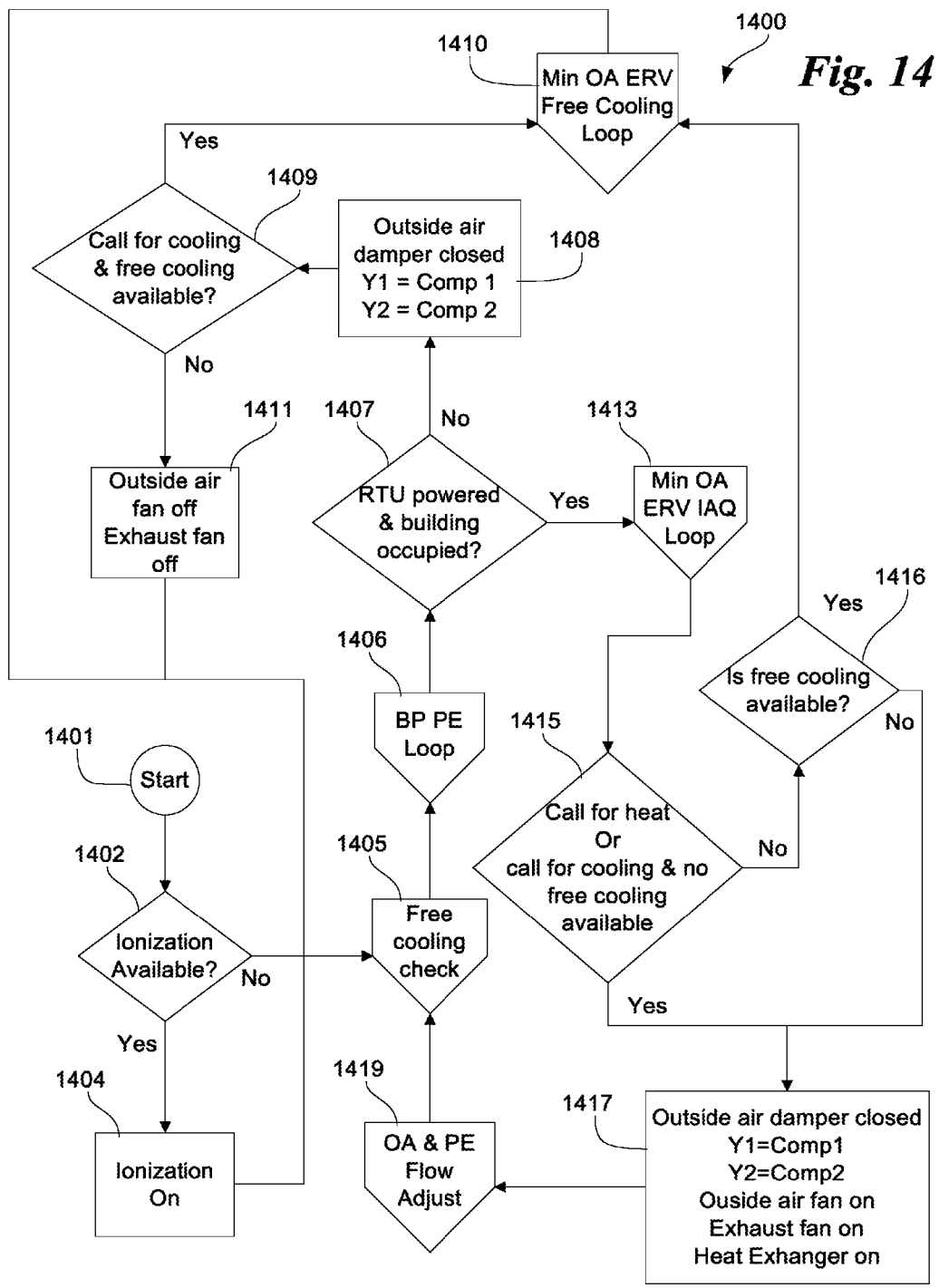
FIG. 14 illustrates another embodiment of the sequence of operations for a controller controlling a unit like the one shown in FIG. 3.

FIG. 14 illustrates another embodiment of an overall control flow for operating a unit similar to the one described above with respect to FIG. 12. However, in this case, the control sequence shown is an example of one designed for a heat exchanger of a larger size relative to the operating requirements involved. It therefore is more expensive to purchase, but is less expensive to operate. In either case, whether the heat exchanger is larger or small relative to the requirements, both operate with ionization which further reduces the load by cleaning more recalculating air.

If ionization is available (1402), the ionization is activated (1404) and the free cooling check (1405) is made (see FIG. 7) as well as the activation of the building powered exhaust loop, if applicable (1406) (see FIG. 13). If the roof top unit is not powered, or the building is not occupied, the controller closes the outside air damper and passes through any first and second stage calls for cooling from the thermostat (1408). If free cooling is also not available, or no call for free cooling has been made (1409), the outside air fan is deactivated, and the exhaust fan is also deactivated (1411) and the loop repeats (1405).

Figure 17:
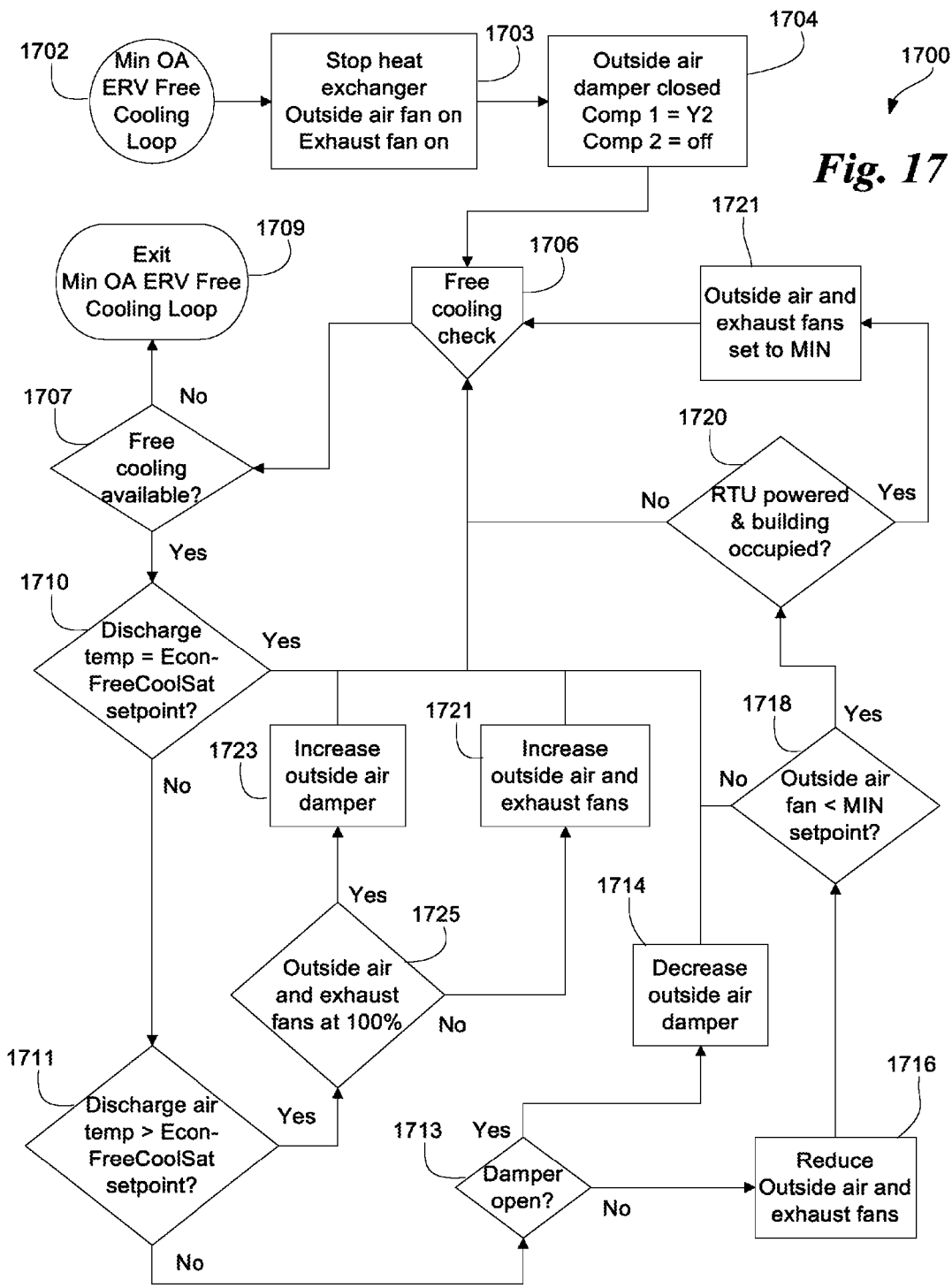
FIG. 17 illustrates another embodiment of the sequence of operations for a controller controlling a unit like the one shown in FIG. 3.

However, if at 1409 a call for free calling has occurred, and free cooling is available from the free cooling check in 1405, then the controller enters the minimum outside air ERV free cooling loop (1410) illustrated in FIG. 17 at 1700. As shown in FIG. 17, the heat exchanger is first deactivated (for example, the wheel is stopped in the case of the heat exchanger shown in FIG. 3), the outside air fan is activated, as is the exhaust fan (1703). The outside air damper is closed, and if a second stage call for cooling has been made, the first stage cooling in the cooling unit in the roof top unit is activated, but the second stage cooling is deactivated as there will be no need for second stage cooling along with free cooling (1704) although first stage cooling may still be appropriate if required.

The main control loop is then entered with a free cooling check at 1706, and if free cooling is not available (1707) results in an immediate exit from the cooling loop (1709). However, if free cooling is available (1707), the controller compares the discharge temperature, that is the temperature of the mixed air flow entering the temperature adjusting region discussed above with respect to FIGS. 1 and 3, with the EconFreeCoolSat setpoint. If the discharge temperatures equal to the EconFreeCoolSat setpoint, then no adjustments need to be made in the loop repeats (1706).

However, if the discharge air temperature is greater than the EconFreeCoolSat setpoint, controller then determines whether the outside air and exhaust fans are at 100% (1725). If so, the controller increases the outside air damper opening (1723) and the loop repeats at 1706. If not, the controller increases the speed of the outside air and exhaust fans (1721), and the loop repeats at 1706.

On the other hand, if the discharge air temperature is less than the EconFreeCoolSat setpoint, controller checks to see if the outside air damper is open (1713), and if so, the controller decreases the outside air damper opening (1714) and loop execution repeats (1706). If the damper is not open (1713), controller reduces the speed of the outside air and exhaust fans (1716), and then checks to see if the outside air fan is operating below a minimum setpoint resulting in air flow into the enclosed space that is below the minimum set by building codes (1720). If not, loop execution continues (1706), and if so, outside air and exhaust fan speeds are set by the controller to create the minimum air flow required by building codes (1721) and loop execution continues (1706).

Figure 16:
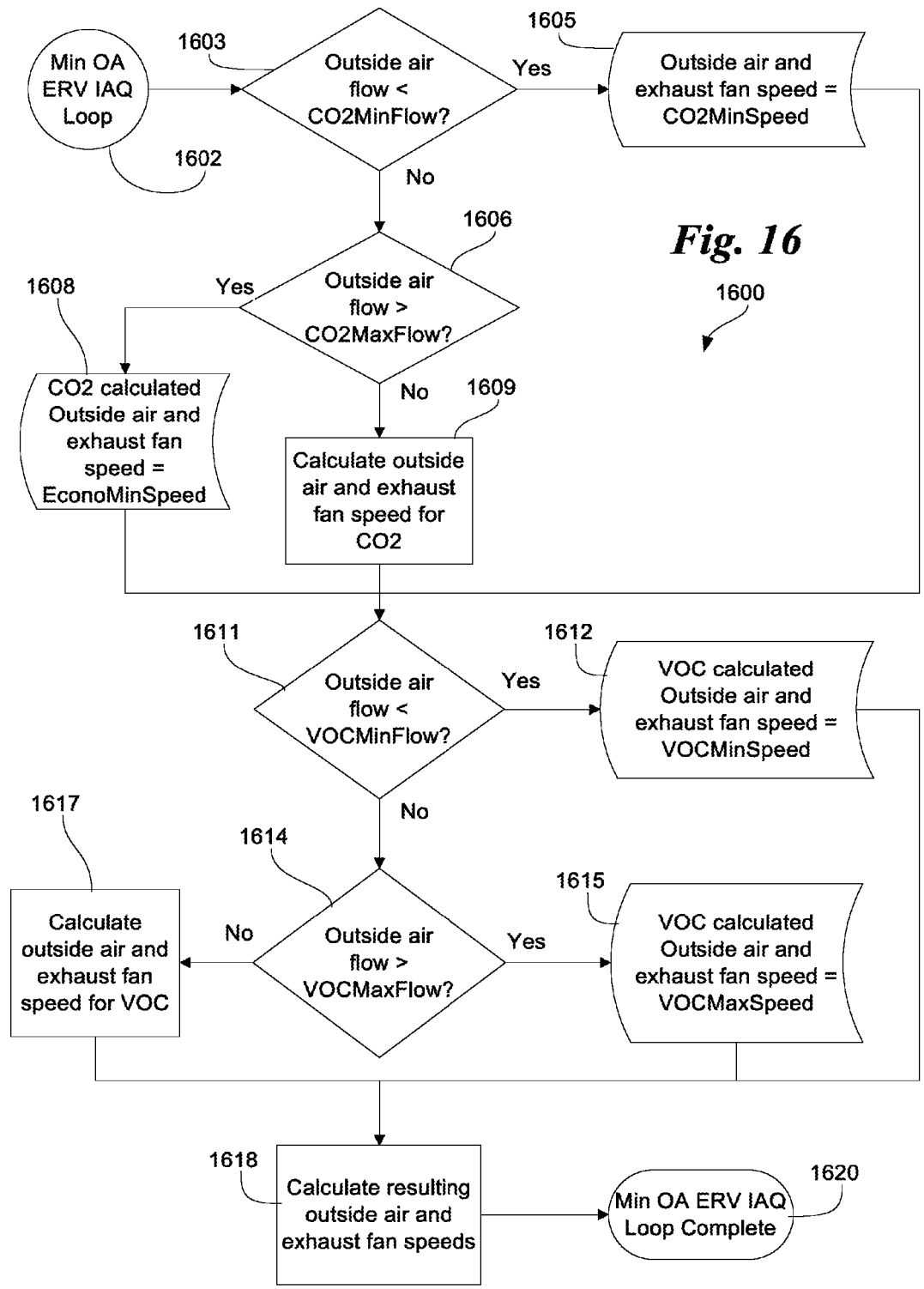
FIG. 16 illustrates one embodiment of a subset of operations for the control sequence shown in FIG. 14.

Returning to FIG. 14, in the case where the rooftop unit is powered and the building is occupied, the controller enters the minimum outside air ERV indoor air quality control (IAQ) loop (1413) illustrated in FIG. 16 at 1600. FIG. 16 is analogous in function to the indoor air quality loop illustrated in FIG. 9 except that instead of calculating damper positions as in FIG. 9, the controller in FIG. 16 is calculating fan speeds. The control loop 1600 also implements various operating parameter rules to create a set of operating parameters that will be used by the controller to control other parts of the system.

The controller first determines if the outside air flow entering the rooftop unit is less than a preset CO2MinFlow setpoint (1603), and if so, the sets a CO2 calculated fan speed for the outside air and exhaust fans to be equal to a preset CO2MinSpeed (1605). The outside air flow is not less than the CO2MinFlow, the controller then determines if the outside air flow is greater than a preset CO2MaxFlow setpoint (1606). If so, the controller sets the CO2 calculated fan speed for the outside air and exhaust fans equal to the EconoMinSpeed set point which is the minimum fan speed required keep CO2 saturation in the enclosed space at or below the required levels. If the outside air flow is not greater than a preset CO2MaxFlow setpoint (1606), the controller calculates outside air and exhaust fan speeds for CO2 (1609), and adds the calculated CO2 fan speed to the set of operating parameters, and begins similar processing for volatile organic compounds (VOCs) at 1611.

Control determines if outside air flow is less than a code enforced minimum VOCMinFlow (1611). If so, the controller sets a second calculated VOC fan speed for the outside air and exhaust fans equal to the VOCMinSpeed (1612). If the outside air flow is not less than VOCMinFlow, the controller determines if the outside air flow was greater than a preset VOCMaxFlow (1614). If so, this calculated VOCs fan speed for the outside air and exhaust fans is set equal to a VOCMaxSpeed (1615) and if not, the controller calculates a VOC fan speed for the outside air and exhaust fans (1617) and adds it to a set of operating parameters.

The controller then calculates the resulting outside air and exhaust fan speed at 1618 taking into consideration the results of the calculations for both CO2 and VOC fan speeds and adds the resulting outside air and exhaust fan speeds to the set of operating parameters. In one embodiment of the calculation, the fan speeds are added together. In another embodiment, the higher of the two fan speeds may be chosen. Other combinations are envisioned as well. The loop then exits at 1620.

Returning to FIG. 14, and having completed the minimum outside air ERV IAQ loop at 1413, processing continues with the controller checks to determine if a call for heat has been made or a call for cooling has occurred and no free cooling is available (1415). If one of these conditions are met, the controller closes the outside air damper, activates the outside air fan, and the exhaust fan, as well as the heat exchanger by, for example, activating the drive assembly to rotate the heat exchange cassette illustrated in FIG. 3 (1417). A first and second stage calls for cooling are also passed through to the rooftop unit from the thermostat signals Y1 and Y2 (1417), and the supply air flow is adjusted (1419 as illustrated in FIG. 15.

Figure 15:
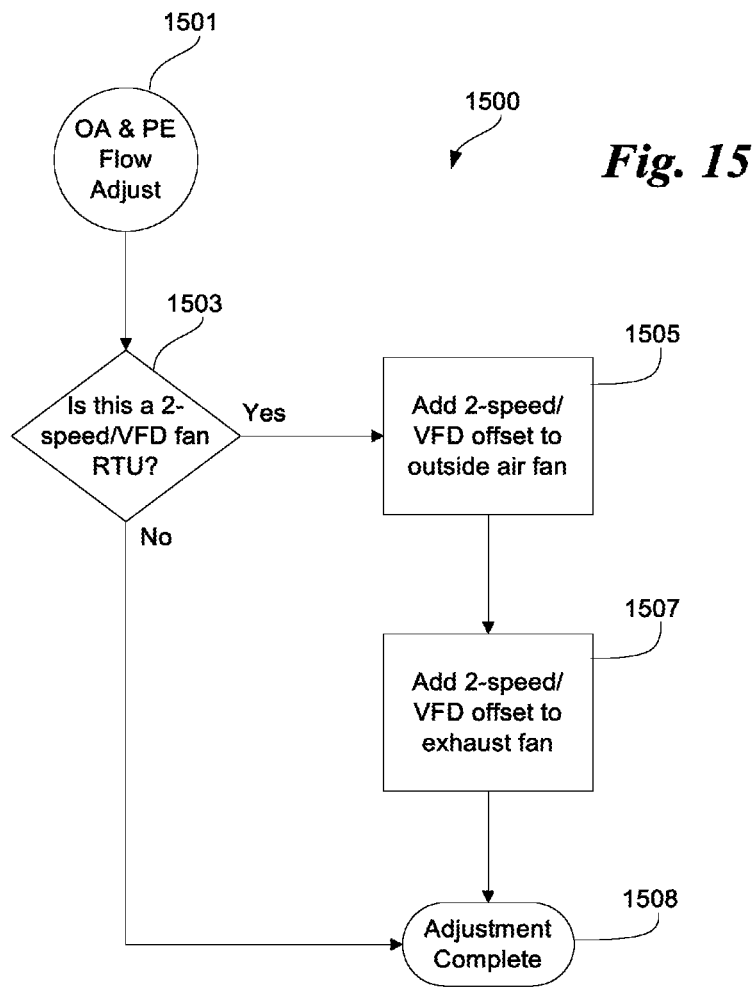
FIG. 15 illustrates one embodiment of a subset of operations for the control sequence shown in FIG. 14.

As shown in FIG. 15 at 1500, the controller first determines if the rooftop unit has a supply air fan that is a 2-speed/VFD fan or not (1503). If so, the controller adds a 2-speed VFD offset to the outside air fan (1505) and the exhaust fan (1507) before the adjustment is complete (1508). In the illustrated sequence, no other adjustments are made if the rooftop unit does not and clued a 2-speed/VFD fan.

Lastly, returning to FIG. 14, if none of the conditions at 1415 are met, that is to say the controller determines that no call for heat has been made and no call for cooling has occurred or no free cooling is available, the controller then refers to the status determined at 1405 as to whether free cooling is available (1416) if not, processing continues at 1417 and if so, processing continues at 1410 where the controller enters the minimum outside air ERV free cooling loop.

The invention claimed is:

1. A method, comprising:
    mixing an outside air from outside an enclosed space with a return air from within the enclosed space in an air mixing device, the air mixing device having an outside air regulating assembly and a return air regulating assembly to respectively direct therefrom a mixed air flow of outside air and return air into the enclosed space, and control a ratio of outside air to inside air within the air mixing device;
    detecting a saturation of one or more airborne contaminants in the enclosed space using one or more airborne contaminant sensors, wherein a controller is responsive to the one or more airborne contaminant sensors;
    ionizing the air in the air mixing device using an ionization device separate from the one or more airborne contaminant sensors; and
    controlling the outside air regulating assembly and the return air regulating assembly to include more outside air in the mixed air flow when the saturation of airborne contaminants in the enclosed space is above an upper setpoint using the controller.

2. The method of claim 1, wherein the act of regulating the outside air regulating assembly includes opening and closing an adjustable closure.

3. The method of claim 1, wherein the act of controlling the air mixing device to include more outside air in the mixed air flow includes opening an adjustable closure.

4. The method of claim 1, wherein the act of regulating the outside air regulating assembly includes adjusting a speed of an air moving apparatus.

5. The method of claim 1, wherein activating the ionization device reduces the saturation of the one or more airborne contaminants.

6. The method of claim 1, further comprising:
    operating a heat exchanger coupled to the air mixing device exchanging heat between the outside air and the return air;
    wherein the outside air passes through the heat exchanger before entering the air mixing device, and at least a portion of the return air passes through the heat exchanger before entering the outside air; wherein the heat exchanger is included in the air mixing device, and the heat exchanger is responsive to the controller.

7. The method of claim 6, wherein the outside air regulating assembly and the return air regulating assembly are included in the heat exchanger.

8. The method of claim 6, wherein a volume of the air entering the mixing device from the heat exchanger is less than about 7.5 cubic feet per minute per occupied load if the ionization device is active.

9. The method of claim 6, wherein a volume of the air entering the mixing device from the heat exchanger is greater than about 10 cubic feet per minute per occupied load if the ionization device is not active.

10. The method of claim 1, wherein the step of ionizing the air decreases the ratio of outside air to inside air within the air mixing device.

11. The method of claim 1, wherein the air mixing device further includes a supply air regulating assembly separate of the outside air regulating assembly and the return air regulating assembly.

12. The method of claim 11, wherein the supply air regulating assembly is positioned adjacent the enclosed space.

13. The method of claim 1, wherein the one or more airborne contaminant sensors includes both a volatile organic compound sensor and a carbon dioxide sensor.

14. The method of claim 6, wherein the heat exchanger includes an exhaust air moving apparatus directing an exhaust air flow through the heat exchanger, the exhaust air flow received from the return air flow.

15. The method of claim 14 further comprising:
    measuring a pressure within the enclosed space using a first pressure sensor;
    measuring a pressure outside the enclosed space in the outside air using a second pressure sensor, wherein the controller is responsive to the first and second pressure sensors; and
    regulating the exhaust air moving apparatus to increase or reduce building pressure when the measured building pressure is less than or exceeds a building pressure setpoint.

16. The method of claim 1 further comprising:
    operating the ionization device whenever the air mixing device is powered.

17. The method of claim 1 further comprising:
    operating the ionization device when activated by the controller.

18. The method of claim 17, wherein the controller favors activating the ionization device to ionize the air to improve air quality over activating an actuator to control the outside air regulating assembly to allow more outside air in to improve air quality.

19. The method of claim 1, wherein the outside air regulating assembly and the return air regulating assembly are separate of each other.

* * * * *